(12) United States Patent
Hagiwara et al.

(10) Patent No.: US 8,659,724 B2
(45) Date of Patent: Feb. 25, 2014

(54) LIQUID CRYSTAL DISPLAY DEVICE, BLACK MATRIX SUBSTRATE AND COLOR FILTER SUBSTRATE

(75) Inventors: Hidesato Hagiwara, Tokyo (JP); Kenzo Fukuyoshi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 529 days.

(21) Appl. No.: 12/805,731

(22) Filed: Aug. 17, 2010

(65) Prior Publication Data

US 2011/0043486 A1  Feb. 24, 2011

(30) Foreign Application Priority Data

Aug. 20, 2009  (JP) .................................. 2009-191326
May 17, 2010  (JP) .................................. 2010-113591

(51) Int. Cl.
*G02F 1/1335*  (2006.01)
(52) U.S. Cl.
USPC .......................................... 349/106; 345/175
(58) Field of Classification Search
None
See application file for complete search history.

(56) References Cited

U.S. PATENT DOCUMENTS

| | | | | |
|---|---|---|---|---|
| 6,500,589 | B1* | 12/2002 | Ohtsu et al. .................... | 349/106 |
| 6,947,017 | B1* | 9/2005 | Gettemy ......................... | 345/63 |
| 7,586,479 | B2 | 9/2009 | Park et al. | |
| 2005/0083465 | A1* | 4/2005 | Niiyama et al. ............... | 349/122 |
| 2006/0098033 | A1* | 5/2006 | Langendijk .................... | 345/694 |
| 2008/0007507 | A1* | 1/2008 | Kim et al. ....................... | 345/92 |
| 2009/0002858 | A1* | 1/2009 | Okutsu et al. .................. | 359/891 |
| 2009/0153785 | A1* | 6/2009 | Iwato et al. .................... | 349/106 |
| 2009/0185115 | A1* | 7/2009 | Nishida et al. ................. | 349/106 |
| 2010/0093119 | A1* | 4/2010 | Shimizu .......................... | 438/29 |
| 2010/0220269 | A1* | 9/2010 | Takama et al. ................. | 349/106 |

FOREIGN PATENT DOCUMENTS

| | | | |
|---|---|---|---|
| JP | 2005-352490 | | 12/2005 |
| JP | 2007-47789 | | 2/2007 |
| JP | 2008-89619 | | 4/2008 |
| JP | 2008-287702 | | 11/2008 |
| JP | 2009-128686 | | 6/2009 |
| JP | 2009-129397 | * | 6/2009 |
| WO | 2006/003807 A1 | | 1/2006 |
| WO | 2006/134740 A1 | | 12/2006 |

OTHER PUBLICATIONS

Japanese Office Action mailed Oct. 15, 2013 in corresponding Japanese Application No. 2010-113591.

* cited by examiner

*Primary Examiner* — Bumsuk Won
*Assistant Examiner* — Ryan Crockett

(57) ABSTRACT

A liquid crystal display device includes a first substrate, a second substrate located opposite the first substrate via a liquid crystal, a blue display element, a green display element, a red display element, a short-wavelength optical sensor, a red optical sensor, and an infrared optical sensor formed on a liquid crystal side surface of the first substrate, and a color filter formed between the first substrate and the second substrate and includes a blue filter, a green filter, a first red filter, a short-wavelength transmission filter, a second red filter, and an infrared transmission filter corresponding to the blue display element, the green display element, the red display element, the short-wavelength optical sensor, the red optical sensor, and the infrared optical sensor, respectively.

18 Claims, 15 Drawing Sheets

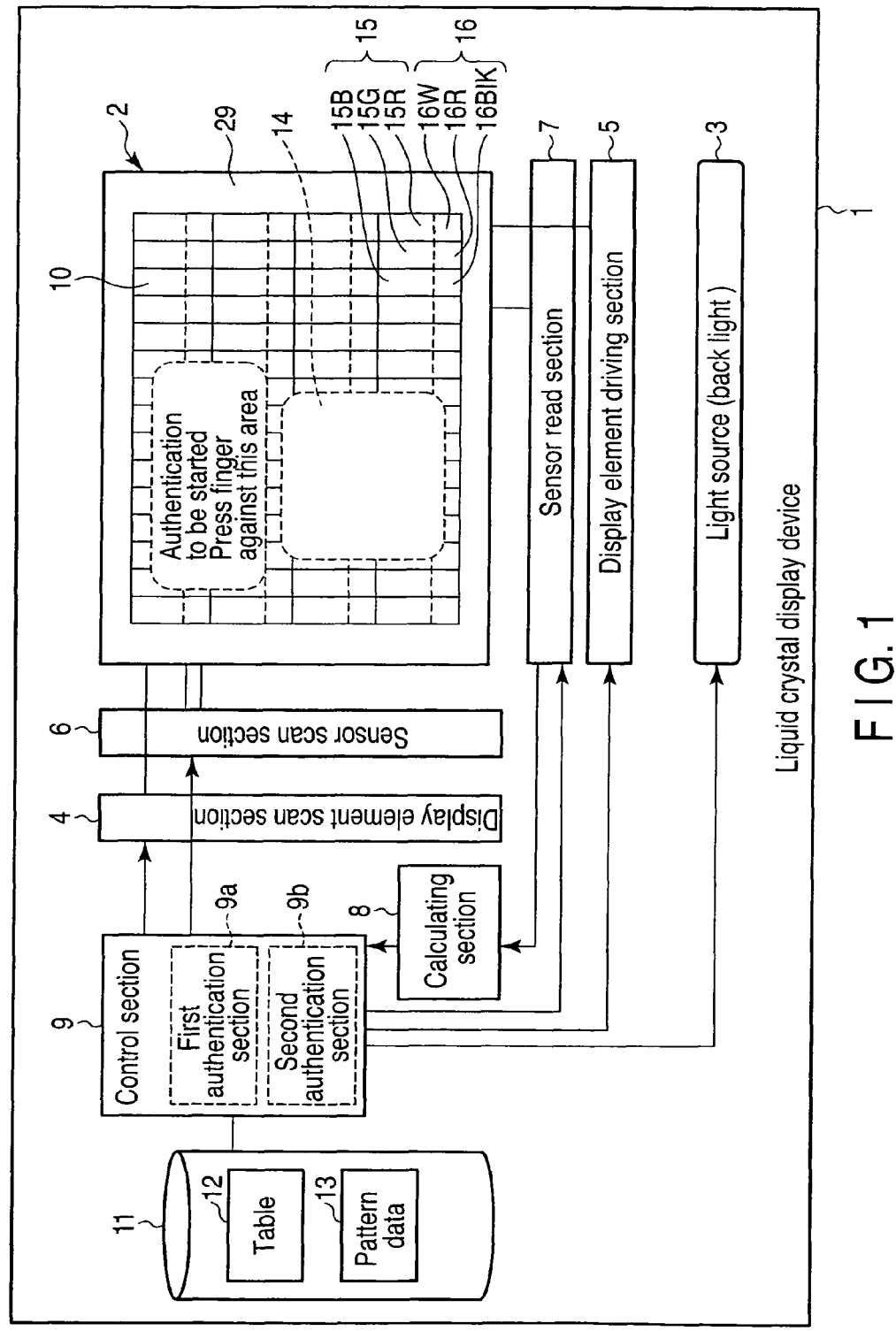
F I G. 1

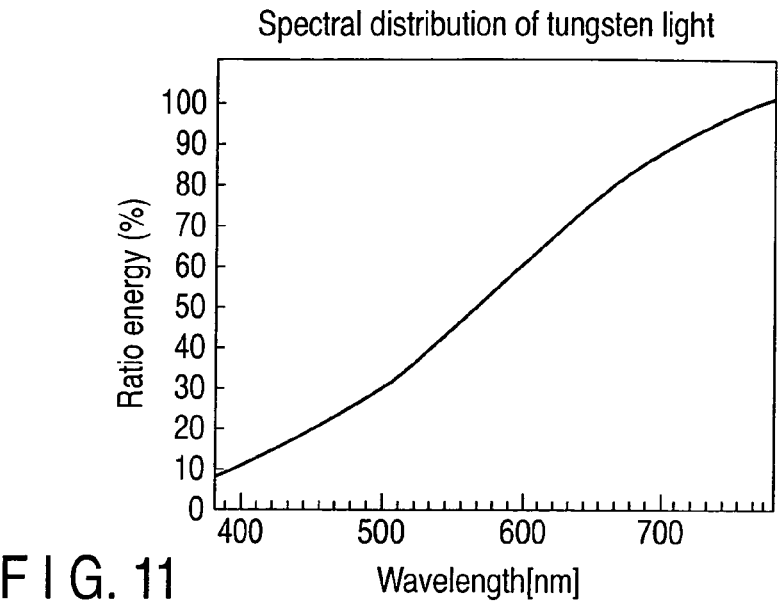
F I G. 11
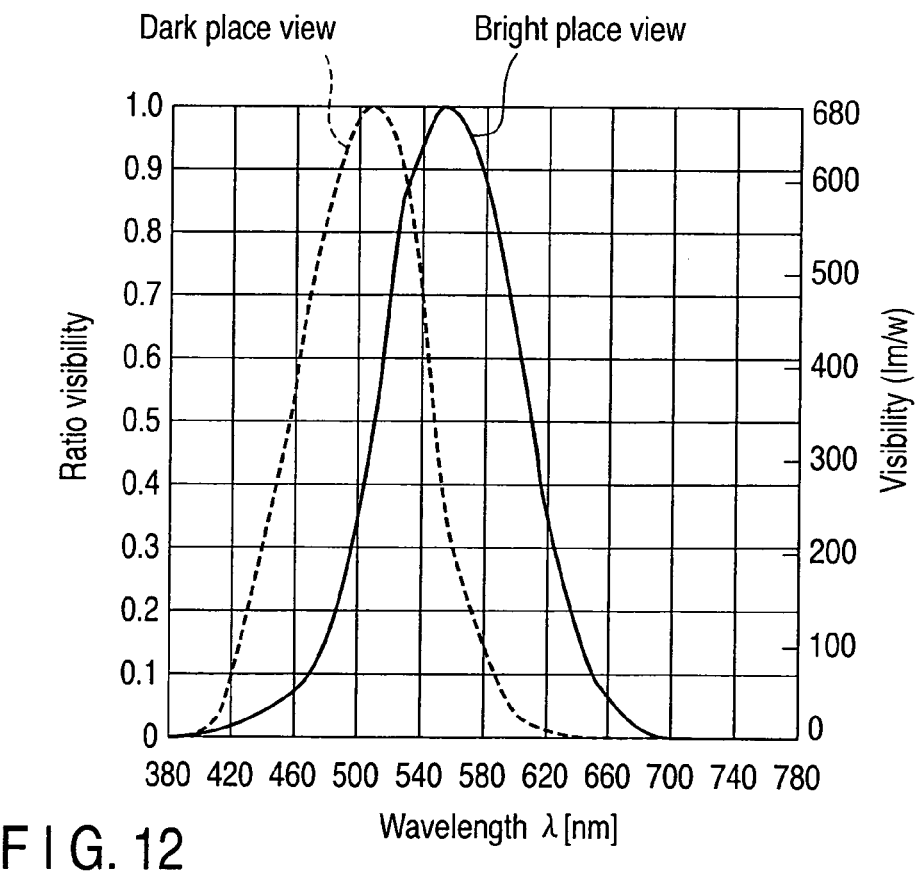
F I G. 12

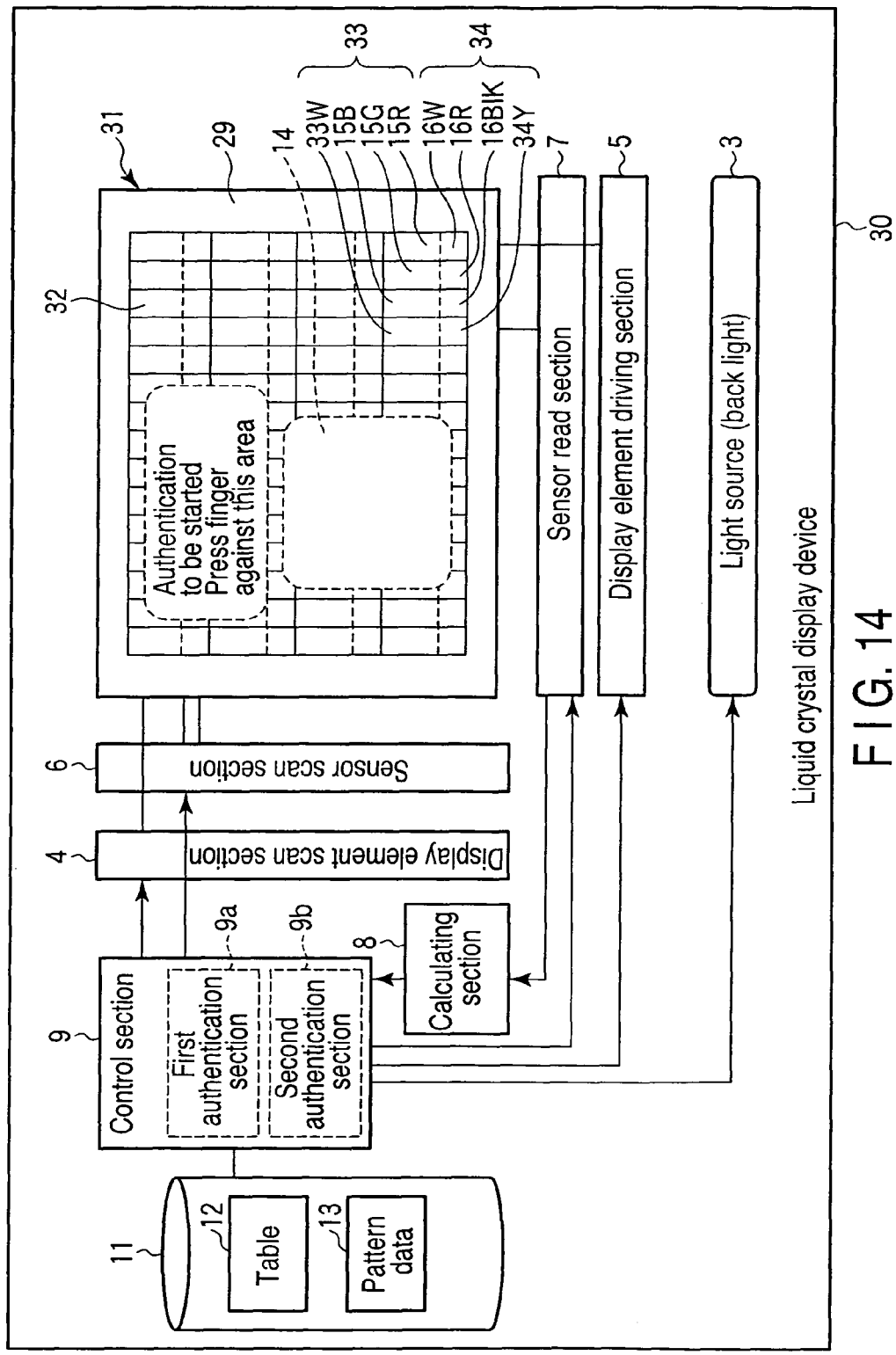
F I G. 14

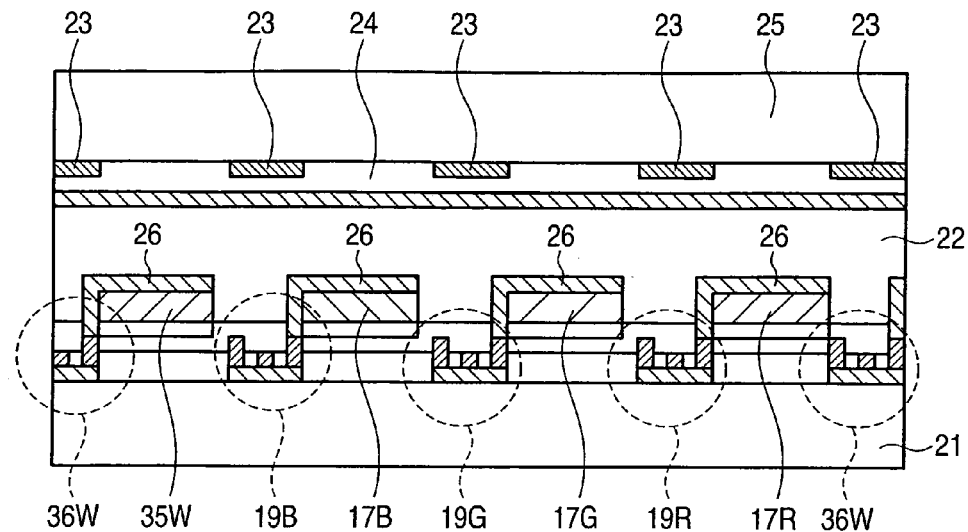
F I G. 16
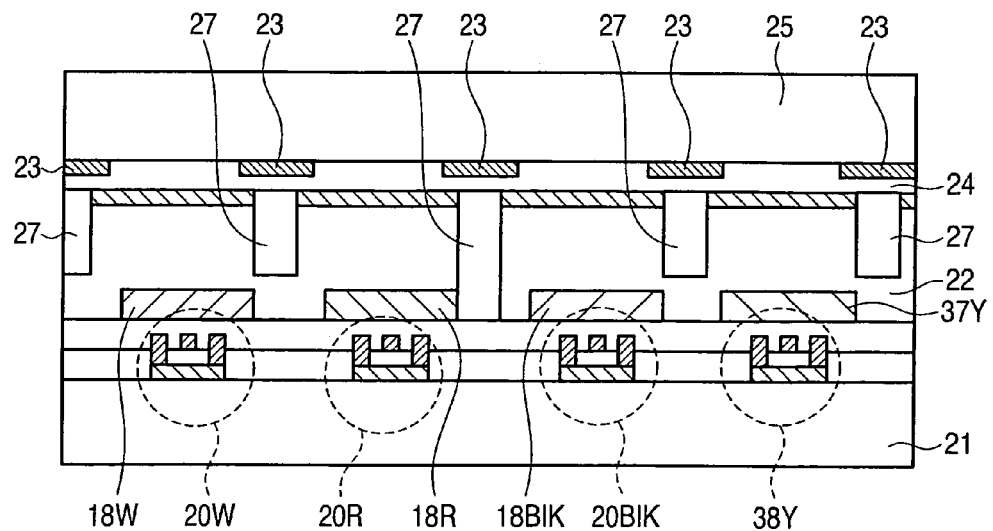
F I G. 17

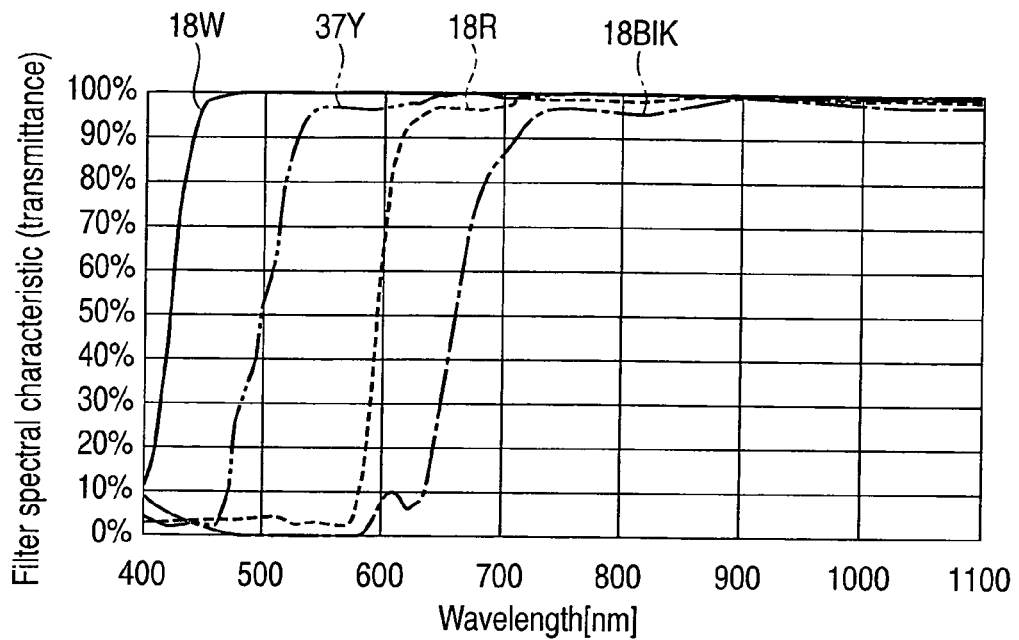
F I G. 18
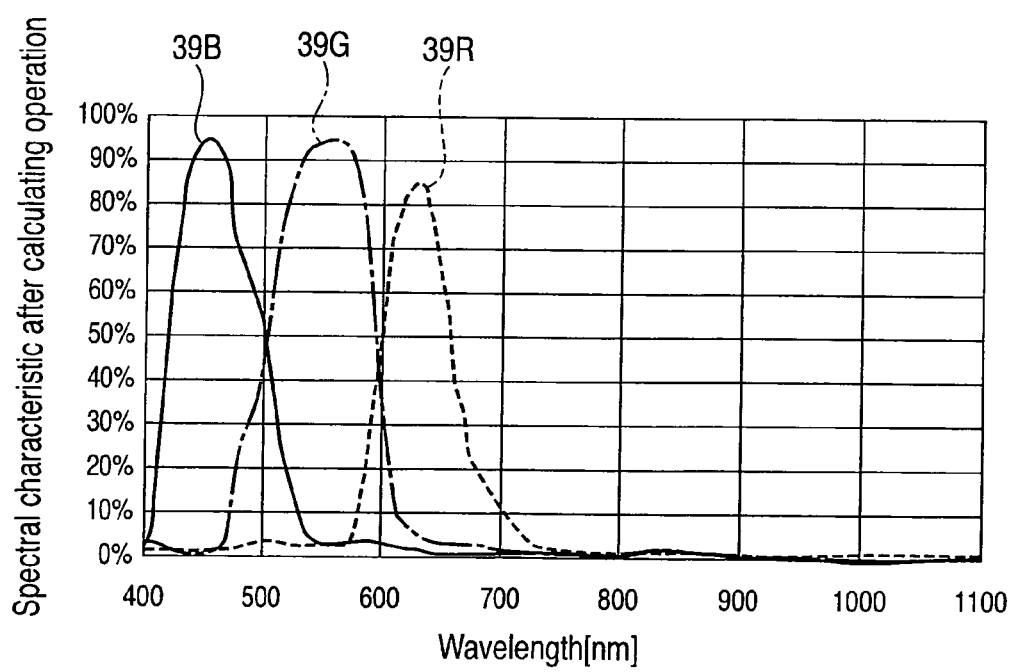
F I G. 19

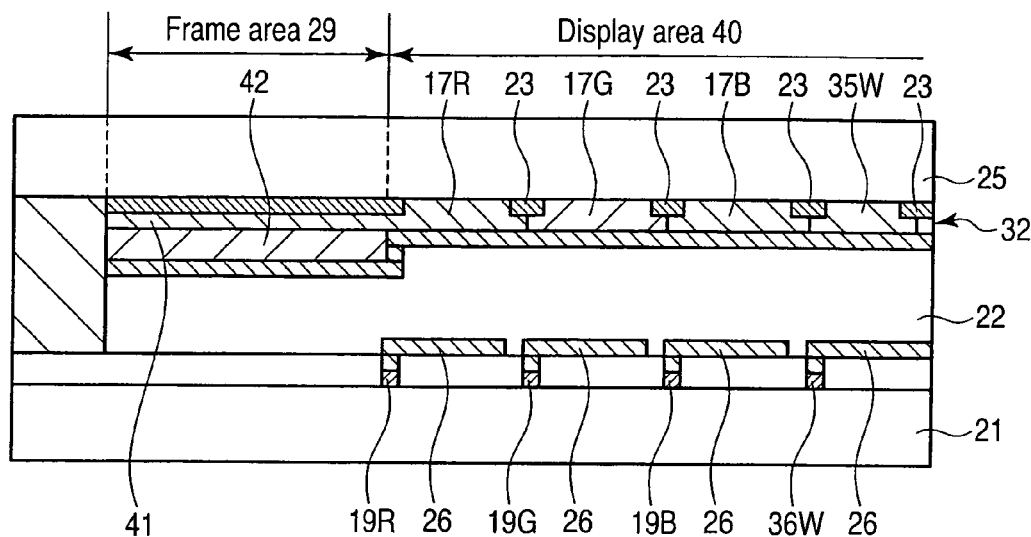
F I G. 22
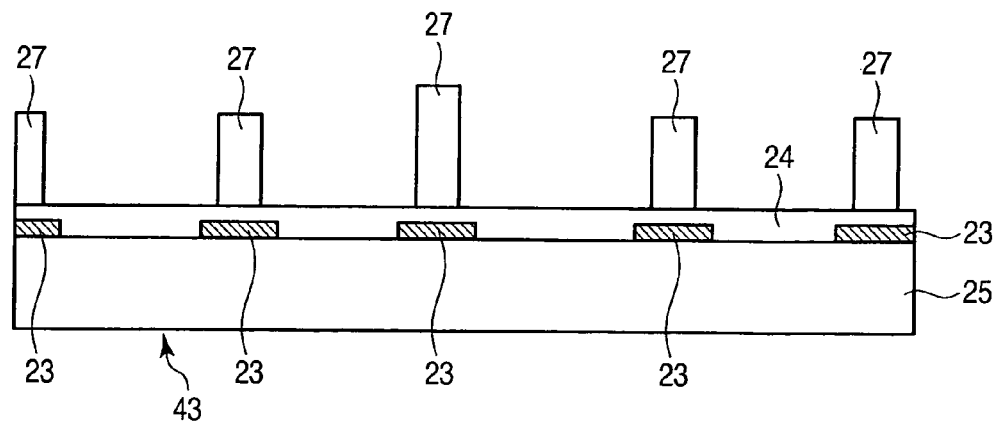
F I G. 23

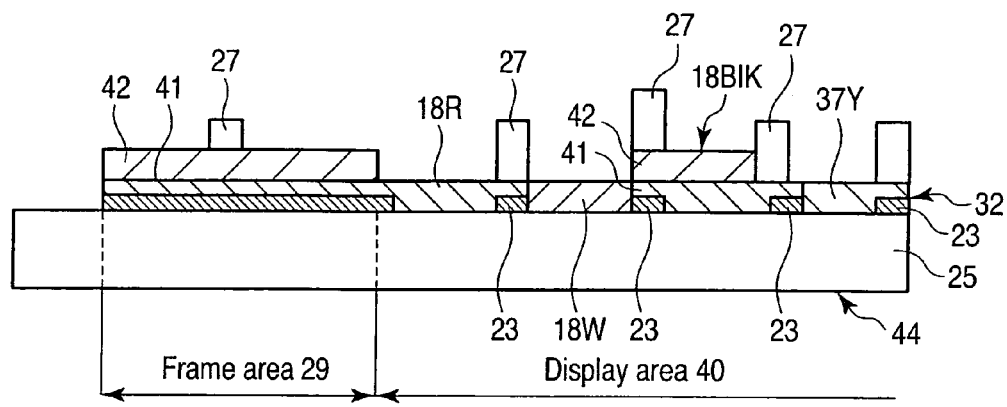
F I G. 24
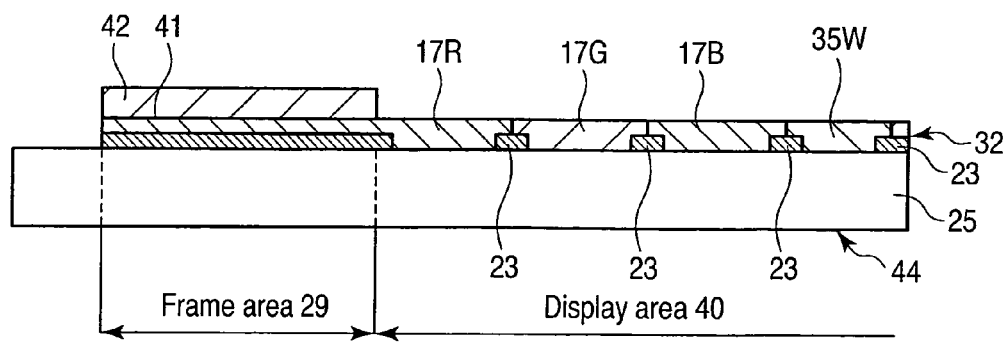
F I G. 25

LIQUID CRYSTAL DISPLAY DEVICE, BLACK MATRIX SUBSTRATE AND COLOR FILTER SUBSTRATE

CROSS-REFERENCE TO RELATED APPLICATIONS

This application is based upon and claims the benefit of priority from prior Japanese Patent Applications No. 2009-191326, filed Aug. 20, 2009; and No. 2010-113591, filed May 17, 2010, the entire contents of both of which are incorporated herein by reference.

BACKGROUND OF THE INVENTION

1. Field of the Invention

The present invention relates to a liquid crystal display device including an optical sensor, and a black matrix substrate and a color filter substrate provided in the liquid crystal device.

2. Description of the Related Art

An active-matrix liquid crystal display device drives a liquid crystal using thin-film transistors, for example, amorphous silicon TFTs (Thin Film Transistors) or polysilicon TFTs. The liquid crystal display device is used in various devices including a mobile device such as a cellular phone, and a large-sized television.

The liquid crystal display device cannot emit light itself and can be classified into a reflective type and a transmissive type. The reflective liquid crystal display device provides display by allowing external light such as natural light to enter a liquid crystal screen so that the light passes through a liquid crystal layer and is then reflected. The transmissive liquid crystal display device includes a light source located on a surface lying opposite an observer, to provide display using transmitted light from the light source. Furthermore, a transflective liquid crystal display device has been put to practical use; the transflective liquid crystal display device operates as a transmissive type using a light source or a reflective type utilizing sunlight or room light depending on an external-light environment (bright or dark environment).

In the liquid crystal display device provided in a mobile device such as a cellular phone or a portable small-sized personal computer, inputting via a keyboard is difficult. Thus, for example, a capacitance-type touch panel or an electric resistance-type touch panel is often installed on a front surface of the liquid crystal display device. However, the touch panel installed on the liquid crystal display device increases the thickness of the liquid crystal display device. In particular, in the liquid crystal display device in the mobile device, light loss attributed to the touch panel may occur, such as surface reflection or loss of transmitted light. This may degrade the quality of liquid crystal display images.

In recent years, the brightness of the transmissive liquid crystal display device has been significantly increased by the increased luminance of a fluorescent lamp installed on a rear surface of the liquid crystal display device or the use of a LED power source with a high luminance. However, when a viewer watches television with such the transmissive liquid crystal display device at night or in a dark place, the screen may be too bright and difficult to see. Furthermore, in the transmissive liquid crystal display device, the light source on the rear surface accounts for about 80% of power consumption. Thus, a reduction in power consumption has been a major challenge.

Furthermore, in recent years, there has been a demand to ensure security for an operation of the liquid crystal screen not only for a device in company and a device such as an automated teller machine in a financial institution but also for the liquid crystal display device in the mobile device.

A Document 1 (Jpn. Pat. Appln. KOKAI Publication No. 2007-47789) discloses a technique that uses an optical sensor. The optical sensor is formed on a TFT substrate on which a thin-film transistor driving a liquid crystal is formed, and is utilized to adjust the brightness of the liquid crystal display device.

A Document 2 (Jpn. Pat. Appln. KOKAI Publication No. 2005-352490) discloses a technique that also uses an optical sensor. The optical sensor is formed on a TFT substrate on which a thin-film transistor driving a liquid crystal is formed, and is used as a touch panel.

A Document 3 (Jpn. Pat. Appln. KOKAI Publication No. 2008-89619) discloses a technique that also uses an optical sensor. The optical sensor is located around the periphery of a TFT substrate on which a thin-film transistor driving a liquid crystal is formed. A blue, green, or red color filter is formed above the optical sensor and used depending on the type of external light.

A document 4 (Jpn. Pat. Appln. KOKAI Publication No. 2009-129397) discloses a display device comprising a plurality of color filters for the respective colors and a photoelectric sensor provided behind a detection filter in which at least two color filters are stacked. The document 4 subtracts a detection value of a separately formed noise removal sensor, from a detection value of the photoelectric sensor.

A document 5 (Jpn. Pat. Appln. KOKAI Publication No. 2009-128686) discloses a display device comprising a first optical sensor section and a second optical sensor section in which two types of color filters are stacked.

The document 1 does not disclose luminance adjustment used for the type of external light { sunlight on a sunny day, sunlight on a cloudy day, or light from a fluorescent lamp) or human visibility.

In the document 2, an error in a user's touch with a liquid crystal screen may result from the influence of the intensity of external light or backlight luminance. Furthermore, the document 2 describes an arrangement of a first optical sensor and a second optical sensor but fails to take into account significant individual differences in fingers among users and the need for authentication for security.

The document 3 fails to take into account the influence of wavelength distribution of light from a backlight, a variation in the temperature of dark current in the optical sensor itself, and variations among elements. It is hoped that the types of external light are distinguished in high accuracy rather than the document 3 is applied. Moreover, the document is a luminance adjustment technique based on external light, and fails to take touch panel inputs with the finger or the like into account.

The document 4 is different from a technique for optical wavelength separation in a visible range carried out by the photoelectric sensor because transmittance is high in the wavelength range of invisible light as described in Claim 2 of the document 4. Thus, the document 4 is not a technique for determining the type of external light and ensuring security or a technique used to adjust the luminance of the liquid crystal display device. Hence, the document 4 is not a technique for distinguishing visible light from the other types of light. Furthermore, the document fails to describe a spectral characteristic of a light shield section provided in a noise removal sensor according to Claim 7 of the document 4 and the sensitivity of a sensor in the wavelength range of invisible light, and fails to clearly specify a detection value from the noise removal sensor associated with a subtraction process, and the result of the subtraction process.

The document 5 proposes a technique to process the difference between a detection signal from a first optical sensor and a detection signal from a second optical sensor section in which the two types of color filters are stacked, as disclosed in claim 1 of the document 5. However, the sensor disclosed in the document 5 has difficulty accurately separating external light into blue (B), green (G), and red (R) and thus accurately determining the type of the external light. Similarly, the technique of the document 5 has difficulty accurately distinguishing a skin color including red and green, from the other colors, and cannot be appropriately used to determine a finger input. Moreover, the detection signal involves an error in transmitted light corresponding to a red range or a near-infrared range (for example, between 700 nm and 800 nm) as shown in FIGS. 6 and 8 of the document 5. Separating a color from one another accurately is difficult. The difficulty in color separation will be described below. As shown by a green absorptivity in FIG. 6 of the document 5, green light has a transmission range between about 700 nm and about 800 nm. Furthermore, as shown in FIGS. 8 and 9 of the document 5, a wavelength corresponding to the 50% transmittance of the optical transmission range of the infrared filter is determined to be about 780 nm. In the technique disclosed in the document 5, the detection signal contains a red optical component and involves an error in a range between 700 nm and 800 nm outside the visible range. Moreover, the document 5 discloses no color materials used for red (R) and blue (B), and fails to describe a specific technique for constructing the red (R) and blue (B) color filter and the infrared filter.

BRIEF SUMMARY OF THE INVENTION

A liquid crystal display device according to a first embodiment of this invention includes a first substrate, a second substrate located opposite the first substrate via a liquid crystal, a blue display element, a green display element, a red display element, a short-wavelength optical sensor, a red optical sensor, and an infrared optical sensor formed on a liquid crystal side surface of the first substrate, and a color filter formed between the first substrate and the second substrate and comprising a blue filter, a green filter, a first red filter, a short-wavelength transmission filter, a second red filter, and an infrared transmission filter corresponding to the blue display element, the green display element, the red display element, the short-wavelength optical sensor, the red optical sensor, and the infrared optical sensor, respectively.

A black matrix substrate according to a second embodiment of this invention is provided in the liquid crystal display device according to the first embodiment. The black matrix substrate includes a black matrix having a light shield capability and located between the plurality of optical sensors formed on the first substrate adjacent to one another when the black matrix substrate which is opposite to the first substrate is placed is seen in a planar view, and at least two types of spacers formed above the black matrix when the black matrix substrate is seen in a planar view, the spacers having different heights.

A color filter substrate according to a third embodiment includes a color filter in which a blue filter, a green filter, a first red filter, a short-wavelength transmission filter, a second red filter, and an infrared transmission filter are arranged in a matrix arrangement, and a light shield area formed around an outer periphery of the color filter.

BRIEF DESCRIPTION OF THE SEVERAL VIEWS OF THE DRAWING

FIG. 1 is a block diagram showing an example of a liquid crystal display device according to a first embodiment of the present invention;

FIG. 11 a graph showing an example of a wavelength distribution of a light bulb;

FIG. 12 is a graph showing an example of a human visibility;

FIG. 14 is a block diagram showing an example of a liquid crystal display device according to a third embodiment of the present invention;

FIG. 16 is a sectional view showing an example of display pixels according to the third embodiment;

FIG. 17 is a sectional view showing an example of light detection pixels;

FIG. 18 is a graph showing an example of spectral characteristics of a short-wavelength transmission filter, a second red filter, an infrared transmission filter, and a yellow filter according to the third embodiment;

FIG. 19 is a graph showing an example of spectral characteristics resulting from subtractions carried out by a calculating section according to the third embodiment;

FIG. 22 is a diagram showing an example of a cross section of a display element of a liquid crystal display device according to the fourth embodiment in a display element arrangement direction;

FIG. 23 is a sectional view showing an example of a black matrix substrate according to a fifth embodiment of the present invention;

FIG. 24 is a first sectional view showing an example of a color filter substrate according to a sixth embodiment of the present invention; and FIG. 25 is a second sectional view showing an example of the color filter substrate according to the sixth embodiment.

DETAILED DESCRIPTION OF THE INVENTION

Figure 2:
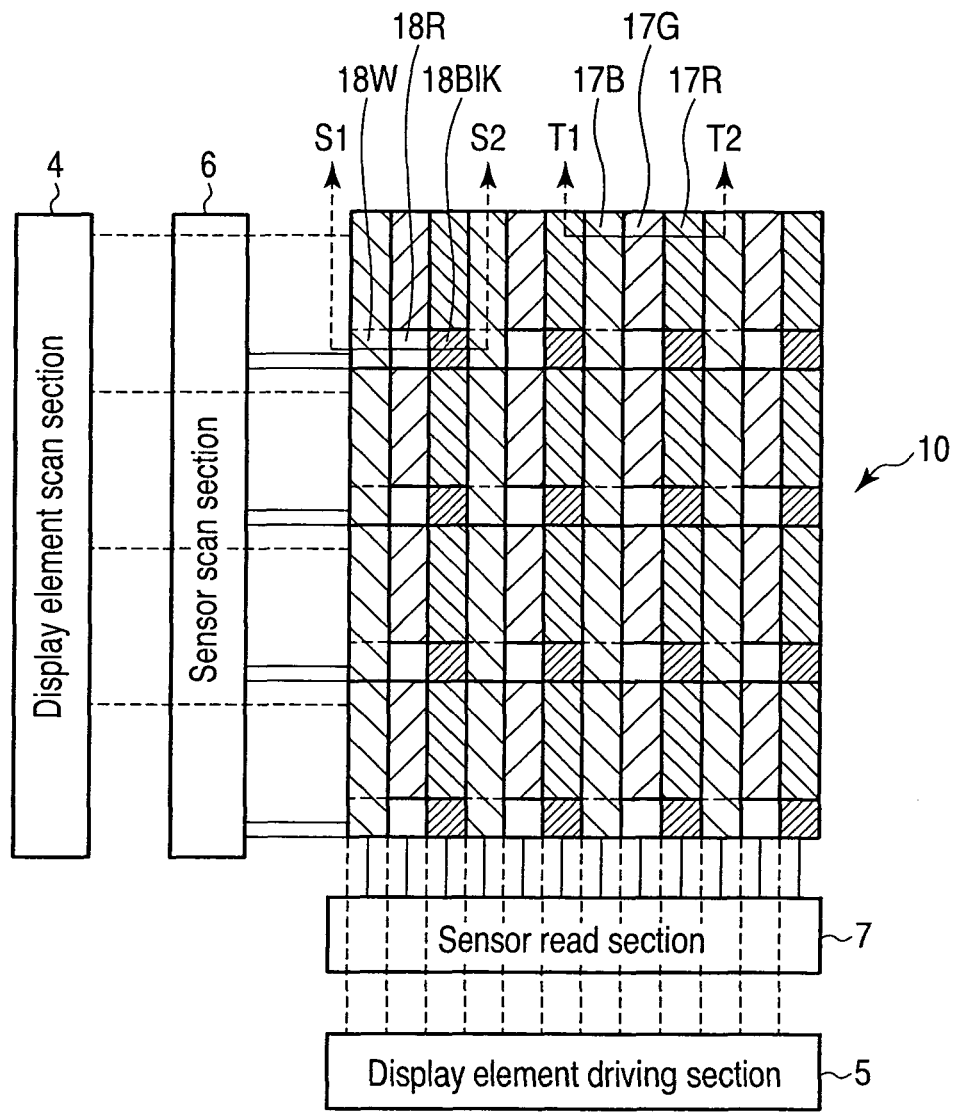
FIG. 2 is a plan view showing an example of the color filter of the liquid crystal display device according to the first embodiment.

Embodiments of the present invention will be described below with reference to the drawings. In the figures described below, the same or almost the same components are denoted by the same reference numerals and will not be described or will be described in brief. Only the other components will be described in detail.

(First Embodiment)

In the present embodiment, a liquid crystal display device will be described which is capable of receiving optical signals and which suppresses the adverse effect of an external light condition on display quality, the liquid crystal display device reducing malfunction.

FIG. 1 is a block diagram showing an example of the liquid crystal display device according to the present embodiment.

The liquid crystal display device 1 according to the present embodiment comprises a light source 3 in the rear of a display screen section 2 (the display screen section 2 is shown at the bottom of FIG. 1 for easy understanding). The light source 3 emits light with three wavelengths for blue, green, and red. For example, the light source 3 may be a fluorescent lamp or LED elements of three-wavelength light emission type, or organic EL elements of a surface light emission type.

A display element scan section 4, a display element driving section 5, a sensor scan section 6, and a sensor read section 7 are electrically connected to the display screen section 2.

The display screen section 2 comprises a color filter 10. In the present embodiment, display pixels 15 and light detection pixels (optical sensors) 16 are disposed in a display area of the display screen section 2.

The display element scan section 4 and the display element driving section 5 operates to allow the display screen section 2 to display an image based on an image signal.

Moreover, the display screen section 2 comprises a frame area 29 having a light shield characteristic on the outer periphery of the display area. The frame area 29 may be formed by optical superimposition of at least one of a red layer, a blue layer, and a green layer or by optically superimposing at least one of the red layer, blue layer, and green layer on a light shield material.

The sensor scan section 6 and the sensor read section 7 operate to read light detection values (measured values) for a plurality of optical wavelength ranges from optical sensors included in the light detection pixels in the display screen section 2. The sensor read section 7 provides the light detection values for an calculating section 8. The light detection values are expressed by at least one of various signals, for example, an electric signal and an optical signal. In the present embodiment, it is assumed that the optical sensor is a photoelectric conversion element and that the light detection value is an electric signal.

The calculating section 8 calculates the intensities of light in a plurality of optical wavelength ranges based on light detection values for the plurality of optical wavelength ranges received from the sensor read section 7. The calculating section 8 then sends signals indicating the intensities of light in the plurality of optical wavelength ranges, to a control section 9. For example, the calculating section 8 calculates a difference between an electric signal into which incident light has been converted by a first optical sensor which measures light in a first optical wavelength range and an electric signal into which incident light has been converted by a second optical sensor which measures light in a second optical wavelength range with the shortest wavelength next to the first optical wavelength range.

In the present embodiment, the calculating section 8 executes a first process of subtracting a detection value from the red optical sensor, from a detection value from a short-wavelength optical sensor, and a second process of subtracting a detection value from an infrared-light optical sensor, from the detection value from the red optical sensor.

The first process determines the signal intensities of a blue component and a green component of external light or reflected light from a position specification object. In the following description, the position specification object is the user's finger by way of example. However, the position specification object may be any other means such as an indicating bar or indicating light which specifies a position on the screen.

The second process determines the signal intensity of a red component of external light or reflected light from the finger.

Such a subtraction as executed by the calculating section 8 allows variations among display elements such as thin-film transistors (TFTs), the adverse effect of dark current, and the adverse effect of the light source 3 to be eliminated from the detection results.

The control section 9 controls the intensity of light emitted by the light source 3 based on the intensities of light in a plurality of optical wavelength ranges received from the calculating section 8. Furthermore, the control section 9 controls the operations of the sensor read section 7, the display element driving section (data driver) 5, the sensor scan section 6, and the display element diving section (gate driver) 4. The sensor read section 7, the display element driving section 5, the sensor scan section 6, and the display element diving section 4 are provided outside the display area.

Based on the light detection values (signal intensities) received from the calculating section 8, a table 12, a threshold value, a determination condition for determining a control value, or a predetermined control calculating expression, which is stored in a storage device 11, the control section 9 determines a optimum control value for the light source 3 which corresponds to the light detection values. The control section 9 sends the determined control value of the light source 3 to the light source 3. The control section 9 controls the light source 3 to adjust a luminance of the liquid crystal display device 1. If the light source 3 is LED elements which emit light in blue, green, or red, respectively, the control section 9 adjusts emission luminance of light from each of the elements to optimize the display on the display screen section 2 in accordance with the brightness or color of external light.

Moreover, the control section 9 executes processing required for detection of an object approaching or touching the display screen section 2, detection of a two-dimension position for a screen by a finger approaching or touching the display screen section 2, detection of a moving status of the finger, and individual authentication.

Specifically, if the light source 3 which emits light with three wavelengths is lighted, the control section 9 senses a distribution status of electric signals into which light has been converted by the light detection pixels 16 arranged on the display screen at equal intervals. The control section 9 further utilizes variations in electric signals into which light has been converted by a part of the light detection pixels 16 arranged in a particular part of the screen to sense an object touching or approaching the display screen, the two-dimension position for the screen of the object, and movement of the object. For example, based on information including position information and identification information on each light detection pixel 16 which are associated with each other, an electric signal from the light detection pixel 16, and identification information on the light detection pixel having emitted the electric signal, the control section 9 determines a position where an electric signal has been emitted.

Furthermore, the control section 9 comprises a first authentication section 9a which displays a window 14 that is a fully light-up area, and a second authentication section 9b which carries out personal authentication by comparing pre-registered pattern data 13 on the user's finger with finger pattern data which is information of the finger touching the fully light-up area and which is expressed by the electric signals obtained from the light detection pixels 16.

In the personal authentication based on the finger, preferably the brightness of the light source 3 is even, and the three wavelength components of the light source, that is, the blue, green, and red components, are in an even state. In particular, in the personal authentication based on the finger, the two wavelength components required to detect the skin color of the finger, that is, the green and red components, need to be accurately detected. To meet this condition, the control section 9 displays a part of the display screen section 2 which is approached or touched by the finger, as a white window 14 (in a normally-black liquid crystal display device, this corresponds to an on state) when the personal authentication is executed. The white window 14 is shown on the display screen when personal authentication is to be carried out. The user brings the user's finger closer to or into touch with the window 14. Then, the light detection pixels 16 arranged in the window 14 detects reflected light from the finger. The detection result is processed by the calculating section 8. The result of the calculating process is input to the control section 9. The control section 9 carries out personal authentication by comparing and checking the processed detection value with and against the pattern data 13 pre-registered in the storage device 11.

In the present embodiment, the control section 9 detects the type of external light and the approaching or touching position specification object, determines whether or not any two-dimension position for the screen is specified by the position specification object, determines the two-dimension position and two-dimension movement for the screen of the position specification object, and determines the consistency between the detection value for the finger and the registered pattern data 13, based on the two types of signal intensities determined by the first and second process executed by the calculating section 8.

In the present embodiment, the window 14 in the liquid crystal display screen is a rectangular area with a size appropriate to enable finger authentication. The window 14 is displayed with text data indicating an authentication operation. The storage device 11 storing the pattern data 13 may be built into the liquid crystal display device 1 or provided in a system connected to the liquid crystal display device 1 so that the system can communicate with the liquid crystal display device 1, or may be an offline storage medium such as an IC card.

The control section 9 may execute various processes based on the detection values from the light detection pixels 16 instead of receiving the detection value calculated by the calculating section 8.

Each of the light detection pixels 16 is located close to the corresponding display element 15, for example, adjacent to the corresponding display element 15. A plurality of the light detection pixels 16 are arranged in the display screen of the liquid crystal display device 1 at almost equal intervals.

In the display screen section 2 of the liquid crystal display device 1, a combination of the display pixels 15 and the light detection pixels 16 is disposed like a matrix arrangement.

The each display pixel 15 includes a blue pixel 15B, a green pixel 15G, and a first red pixel 15R, respectively.

The each light detection pixel 16 includes a short-wavelength pixel 16W, a second red pixel 16R, and an infrared pixel 16Blk, respectively.

FIG. 2 is a plan view showing an example of the color filter 10 of the liquid crystal display device 1 according to the present embodiment.

Figure 3:
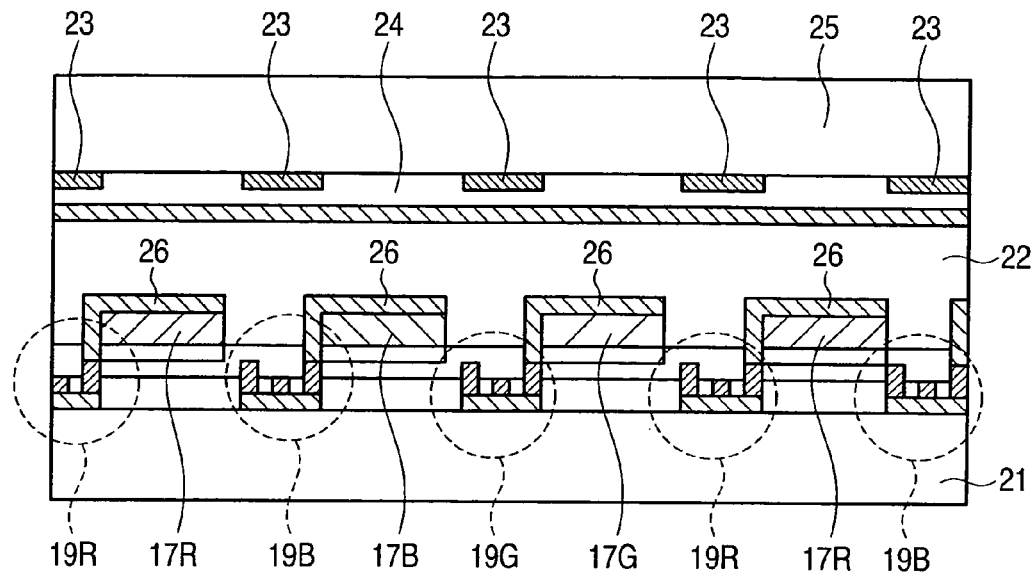
FIG. 3 is a sectional view showing an example of display pixels according to the first embodiment.

FIG. 3 is a sectional view showing an example of the display pixel 15 and taken along line T1-T2 in FIG. 2.

Figure 4:
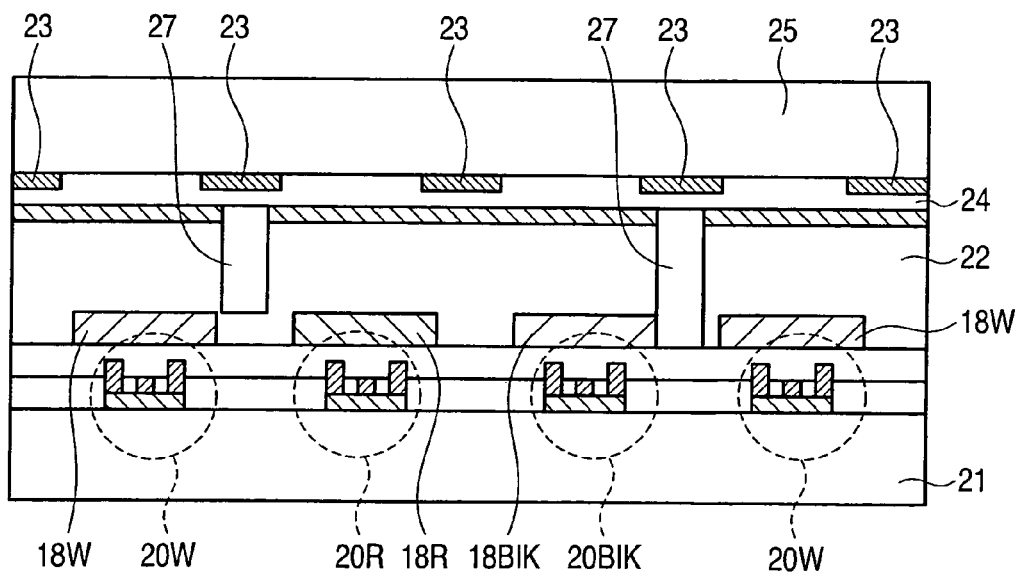
FIG. 4 is a sectional view showing an example of light detection pixels according to the first embodiment.

FIG. 4 is a sectional view showing an example of the light detection pixel 16 and taken along line S1-S2 in FIG. 2.

The color filter 10 comprises a blue filter 17B for the blue pixel 15B, a green filter 17G for the green pixel 15G, a first red filter 17R for the first red pixel 15R, a short-wavelength transmission filter (transparent filter) 18W for the short-wavelength pixel 16W, a second red filter 18R for the second red pixel 16R, and an infrared transmission filter 18Blk for the infrared pixel 16Blk.

The infrared transmission filter 18Blk is implemented by optically superimposing a plurality of colors on one another. For example, in the present embodiment, the infrared transmission filter 18Blk is formed of one layer in which a red organic pigment and a blue organic pigment are mixed.

The optical superimposition includes mixture of a plurality of pigments and superimposition of a plurality of filters for the respective colors. That is, the infrared transmission filter 18Blk may be formed of one layer in which a red organic pigment and a blue organic pigment are mixed or two layers comprising a red filter and a blue filter, respectively.

Furthermore, the optical superimposition includes a configuration in which a filter is placed directly on an optical sensor or placed indirectly above the optical sensor so as to lie opposite the sensor at a certain distance (for example, between 2 μm and 6 μm) from the sensor. The optical superimposition means a configuration substantially acting on incident light or light from the light source 3.

The short-wavelength transmission filter 18W, the second red filter 18R, and the infrared transmission filter 18Blk may be arranged in an opening in a substrate 25 located opposite a substrate 21 via a liquid crystal 22.

The short-wavelength transmission filter 18A according to the present embodiment is a filter which transmits a blue wavelength light and long wavelength-side light following the blue wavelength light or a green wavelength light and long wavelength-side light following the green wavelength light. In the description of the present embodiment, the former filter is referred to as a transparent filter, and the latter filter is referred to as a yellow filter.

In the blue pixel 15B, green pixel 15G, and first red pixel 15R, included in the display pixels 15, a blue display element (for example, a thin transistor) 19B, a green display element 19G, and a red display element 19R are provided below the blue filter 17B, green filter 17G, and first red filter 17R, respectively.

In the short-wavelength pixel 16W, second red pixel 16R, and infrared pixel 16Blk, included in the light detection pixel 16, a short-wavelength optical sensor 20W, a red optical sensor 20R, and an infrared optical sensor 20Blk are provided below the short-wavelength transmission filter 18W, the second red filter 18R, and the infrared transmission filter 18Blk, respectively. The short-wavelength optical sensor 20W, red optical sensor 20R, and infrared optical sensor 20Blk are, for example, photoelectric conversion elements converting light into electricity.

In the present embodiment, the blue display element 19B, green display element 19G, red display element 19R, short-wavelength optical sensor 20W, red optical sensor 20R, and infrared optical sensor 20Blk are formed on one surface of the substrate 21. The light source 3 is provided on the other surface of the substrate 21 (the rear surface located opposite the screen side).

The filters 17B, 17G, 17R, 18W, 18R, and 18Blk in the color filter 10 are disposed in the display area above the substrate 21.

The substrate 25 comprising a black matrix 23 and a smoothed layer 24 that is a transparent resin are arranged above the display elements 19B, 19G, and 19R, the optical sensors 20W, 20R, and 20Blk, and the filter 17B, 17G, 17R, 18W, 18R, and 18Blk, via the liquid crystal 22. That is, in FIG. 3 described above, the display elements 19B, 19G, and 19R and transparent electrodes 26 electrically connected to the display elements 19B, 19G, and 19R are formed on the substrate 21. The filters 17B, 17G, and 17R, the liquid crystal 22, the black matrix 23, adapted to improve contrast, and the substrate 25 are stacked above the surface on which the display elements 19B, 19G, and 19R and the transparent electrodes 26 are formed.

The black matrix 23 is formed by, for example, adding an organic pigment to a material for the infrared transmission filter 18Blk so that the resulting component serves to block light. In the present embodiment, the black matrix 23 is formed on the substrate 25. However, the black matrix 23 may be formed at least either on the substrate 25 or one surface of the substrate 21 which is closer to the liquid crystal 22.

At least one of the frame area 29 and the black matrix 23 may comprise a cured film of a resin material containing an ultraviolet absorbent that absorbs light on the side of a wavelength shorter than 420 nm or may be covered with the cured film.

In FIGS. 3 and 4 described above, the light source 3, a light diffuser panel, a polarizing film, a phase difference film are omitted. The light source and the light diffuser plate are arranged on the back surface of the substrate 21, that is, a surface of the substrate 21 located opposite the liquid crystal 22.

Light from the light source 3 is emitted to the exterior via the filters 17B, 17G, and 17R.

Externally incident light is received by the optical sensors 20W, 20R, and 20Blk via the filters 18W, 18R, and 18Blk.

In the present embodiment, the substrate 21 is located opposite the substrate 25 via the liquid crystal 22. The color filter 10 is formed between the substrate 21 and the substrate 25. In the present embodiment, the color filter 10 is formed for a side of the surface of the substrate 21 which is closer to the liquid crystal 22.

That is, the color filter 10 according to the present embodiment is formed on the surface of the substrate 21 on which the optical sensors 20W, 20R, and 20Blk and the display elements 19B, 19G, and 19R driving the liquid crystal are formed. The optical sensors 20W, 20R, and 20Blk and the display elements 19B, 19G, and 19R are formed on one of the two surfaces of the substrate 21 which is located opposite the observer of the liquid crystal display device 1 and which is in contact with the liquid crystal 22.

As shown in FIG. 4 described above, a stack (laminating) of the short-wavelength optical sensor 20W and the short-wavelength transmission filter 18W, a stack of the red optical sensor 20R and the second red filter 18R, and a stack of the infrared optical sensor 20Blk and the infrared transmission filter 18Blk are arranged on the substrate 21 as the optical sensor 16. A spacer 27 is located between the substrates 21 and 25 to regulate (remain) a gap in the liquid crystal 22.

Figure 5:
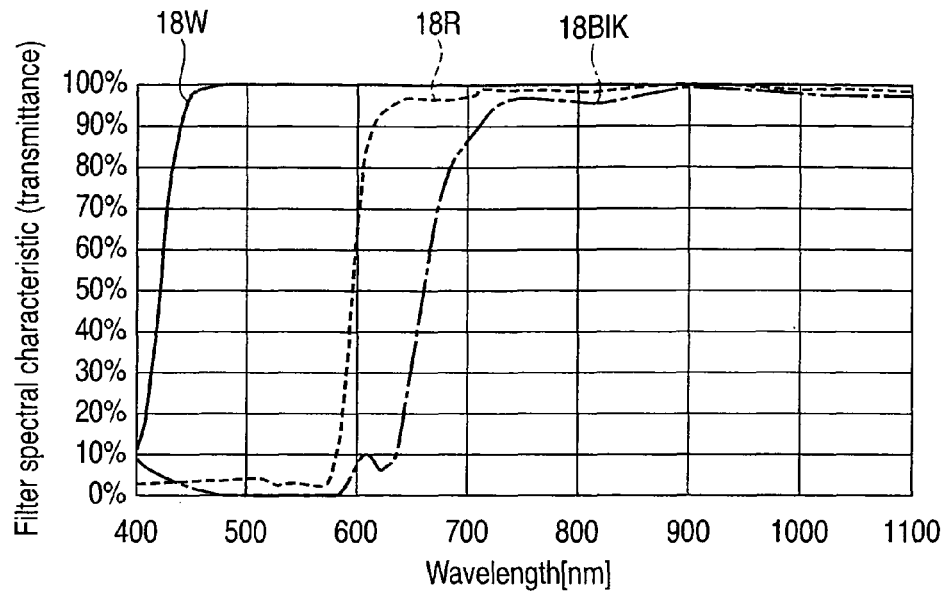
FIG. 5 is a graph showing an example of the spectral characteristics of a short-wavelength transmission filter, a second red filter, and an infrared transmission filter.

FIG. 5 is a graph showing an example of the spectral characteristics of the short-wavelength transmission filter 18W, the second red filter 18R, and the infrared transmission filter 18Blk.

The short-wavelength transmission filter 18W includes a 50% transmittance at an optical wavelength range between 380 nm and 450 nm and offers a transmittance characteristic such that a short wavelength side transmittance is lower than the 50% transmittance when a wavelength corresponding to the short wavelength side transmittance is smaller than a wavelength corresponding to the 50% transmittance, and a long wavelength side transmittance is higher than the 50% transmittance when a wavelength corresponding to the long wavelength side transmittance is larger than the wavelength corresponding to the 50% transmittance. The short-wavelength transmission filter 18W is optically superimposed above the short-wavelength optical sensor 20W. The transmittance of the short-wavelength transmission filter 18W is low for light with a wavelength shorter than 380 nm, and increases rapidly when the optical wavelength becomes equal to or longer than about 380 nm. The transmittance is kept at a large value when the optical wavelength is close to 450 nm or equal to or longer than 450 nm.

The formation of the short-wavelength transmission filter 18W may be omitted provided that the omission avoids affecting an orientation of the liquid crystal 22. If the polarizing film or phase difference film stuck to both sides of a liquid crystal cell provides an ultraviolet cut function, the short-wavelength transmission filter 18W may be omitted.

The second red filter 18R includes a transmittance of 50% at an optical wavelength range between 580 nm and 620 nm and offers a transmittance characteristic such that a short wavelength side transmittance is lower than a 50% transmittance when a wavelength corresponding to the short wavelength side transmittance is smaller than a wavelength corresponding to the 50% transmittance, and a long wavelength side transmittance is higher than the 50% transmittance when a wavelength corresponding to the long wavelength side transmittance is larger than the wavelength corresponding to the 50% transmittance. The second red filter 18R is optically superimposed above the red optical sensor 20R. The transmittance of the second red filter 18R is low for light with a wavelength shorter than about 570 nm, and increases rapidly when the optical wavelength becomes equal to or longer than about 570 nm. The transmittance is kept at a large value when the optical wavelength is nearly 640 nm or equal to or longer than 640 nm.

The infrared transmission filter 18Blk has a transmittance of 50% at an optical wavelength range between 650 nm and 720 nm and offers a transmittance characteristic such that a short wavelength side transmittance is lower than a 50% transmittance when a wavelength corresponding to the short wavelength side transmittance is smaller than a wavelength corresponding to the 50% transmittance, and a long wavelength side transmittance is higher than the 50% transmittance when a wavelength corresponding to the long wavelength side transmittance is larger than the wavelength corresponding to the 50% transmittance. The infrared transmission filter 18Blk is optically superimposed above the infrared optical sensor 20Blk. The transmittance of the infrared transmission filter 18Blk is low for light with a wavelength shorter than about 580 nm, and increases rapidly when the optical wavelength becomes equal to or longer than about 580 nm. The transmittance is kept at a large value when the optical wavelength is nearly 750 nm or equal to or longer than 750 nm.

It is assumed that a transmittance of 100% is a transmittance of glass forming a substrate. A wavelength corresponding to the 50% transmittance is an optical wavelength (nm) at which a filter to be measured has a transmittance of 50%.

In the present embodiment, the filters 18W, 18R, and 18Blk stacked above the optical sensors 20W, 20R, and 20Blk as well as a yellow filter 37Y shown in FIG. 17 preferably have characteristics such that the transmittance is low when the wavelength is smaller than the value corresponding to the 50% transmittance and is high when the wavelength is larger than the value corresponding to the 50% transmittance.

The transmittance at each wavelength in the spectral characteristics in FIG. 5 is multiplied by the sensitivity of each of the optical sensors 20W, 20R, and 20Blk at each wavelength to determine the effective sensitivities of the optical sensor 20W, 20R, and 20Blk that uses the filters 18W, 18R, and 18Blk.

Figure 6:
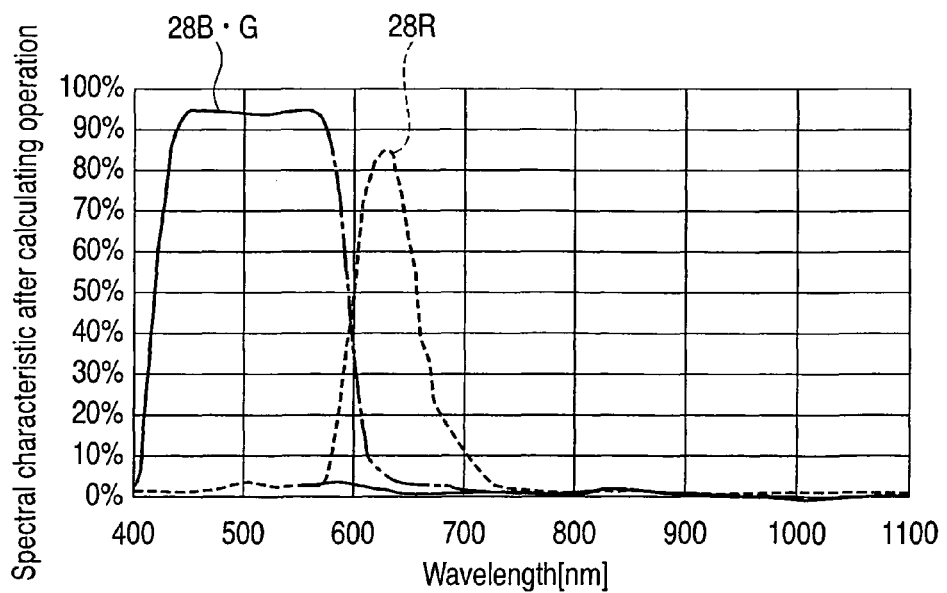
FIG. 6 is a graph showing an example of spectral characteristics resulting from subtractions carried out by a calculating section according to the first embodiment.

FIG. 6 is a graph showing an example of spectral characteristics resulting from subtractions carried out by the calculating section 8 according to the present embodiment.

At each wavelength, a subtraction of the transmittance of the second red filter 18R from the transmittance of the short-wavelength transmission filter 18W corresponds to a spectral characteristic 28B•G. A wavelength range with a high transmittance in the spectral characteristic 28B•G corresponds to a wavelength range of blue and green light.

Thus, the calculating section 8 subtracts the detection value from the read optical sensor 20R, from the detection value from the short-wavelength optical sensor 20W to calculate a blue and green detection value.

A spectral characteristic 28R is obtained by subtracting the transmittance of the infrared transmission filter 18Blk from the transmittance of the second red filter 18R for each wavelength. In the spectral characteristic 28R, a wavelength range with a high transmittance corresponds to a wavelength range of red light.

Thus, the calculating section 8 subtracts the detection value from the infrared optical sensor 20Blk, from the detection value from the red optical sensor 20R to calculate a red detection value.

Based on the blue and green detection value and the red detection value both calculated by the calculating section 8, the control section 9 executes processing required for, for example, control of the light source 3, detection of the approaching or touching position specification object, detection of a specified two-dimension position and two-dimension movement for the screen, and the individual authentication.

An increase and a decrease in the spectral characteristic (transmittance varying according to wavelength increasing from the short wavelength side to the long wavelength side) in FIG. 6 obtained by the subtraction executed by the calculating section 8 is sharp. Furthermore, A peak of the blue and green transmittance determined by the subtraction has a high value. That is, the transmittance determined by the subtraction is high in a wavelength range that is important for detection of blue and green light. Thus, blue and green light can be accurately detected by subtracting the red detection value from a detection value for a short wavelength when the blue and green light is detected. This also applies to detection of red light. Red light can be accurately detected by subtracting the infrared detection value from the red detection value.

In the present embodiment, the substrate 25 is provided on the substrate 21 via the liquid crystal 22. The substrate 25 comprises the black matrix 23, the smoothed layer 24, and the spacer 27.

The transparent resin forming the smoothed layer 24 may be a resin containing about 3%, in solid ratio, of coumarin dye and which provides an ultraviolet absorption function. The smoothed layer 24 and the spacer 27 are different in thickness (height).

The smoothed layer 24 and the spacer 27 are formed in the same step using, for example, a halftone mask. A transparent resin to which an ultraviolet absorbent is added absorbs light with a wavelength shorter than 420 nm. The amount of ultraviolet absorbent added is adjusted in accordance with a purpose such as adjustment of the thickness of the smoothed layer 24 or a wavelength position of a 50% transmittance point.

The spacer 27 includes a main spacer and a sub-spacer regulating a cell gap (liquid crystal thickness) of the liquid crystal 22. The sub-spacer is lower than the main spacer.

The spacer 27 is located at a position where the spacer 27 does not interfere with the display elements 19B, 19G, and 19R and on a side of the liquid crystal 22 of the black matrix 23. Furthermore, the spacer 27 is disposed between one optical sensor and another optical sensor, for example, between the optical sensors 20W and 20Blk as shown in FIG. 4 described above.

That is, when the liquid crystal display device 1 is seen in a planar view, the spacer 27 is positioned under the black matrix 23 and between a plurality of adjacent optical sensors. When the spacer 27 is thus located, the display elements 19B, 19G, and 19R and the optical sensors 20W, 20R, and 20Blk are not present under the spacer 27. Thus, even with a high pressure applied to the display surface of the liquid crystal display device 1, the display elements 19B, 19G, and 19R and the optical sensors 20W, 20R, and 20Blk can be prevented from being destroyed.

In the present embodiment, at least one of the short-wavelength transmission filter 18W and the smoothed layer 24 is preferably formed of a transparent resin with an ultraviolet absorption function for absorbing incident light at an optical wavelength shorter than 420 nm. When at least one of the short-wavelength transmission filter 18W and the smoothed layer 24 has the ultraviolet absorption function, possible noise can be prevented which results from reception of ultraviolet light by the optical sensors 20W, 20R, and 20Blk and display elements 19B, 19G, and 19R, which are formed of amorphous silicon or polysilicon.

For example, silicon photodiodes are used as the optical sensors 20W, 20R, and 20Blk.

Figure 7:
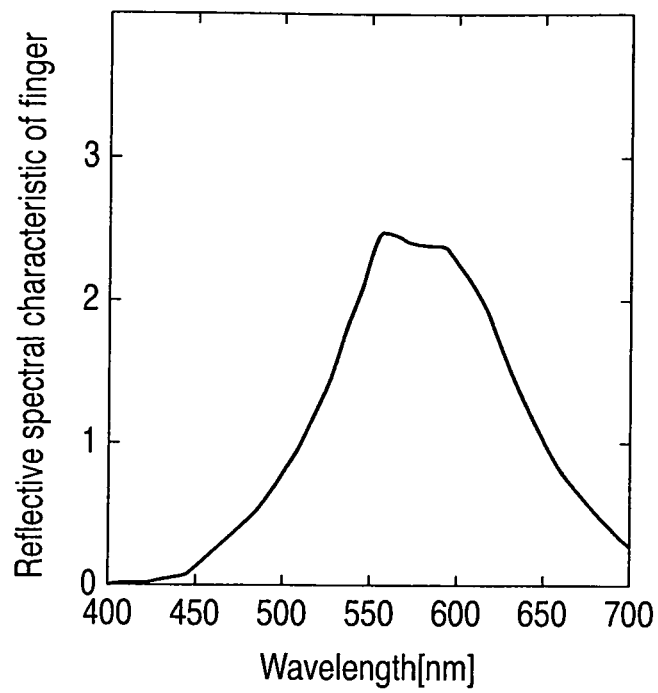
FIG. 7 is a graph showing an example of a spectral reflectance of a finger.

FIG. 7 is a graph showing an example of a spectral reflectance of the finger.

The spectral reflectance of the finger between about 450 nm and about 700 nm has a reflection color as a broad. But the spectral reflectance of the finger involves significant individual difference. The color is given mainly by melanine and hemoglobin. Measurement of the finger color is likely to be affected by optical scattering inside the finger. The skin color is preferably extracted from the reflected light as green (about 550 nm) and red (about 610 nm).

Thus, in the present embodiment, accurate authentication is achieved as follows. The green and blue detection value is determined by subtracting the detection value of the red optical sensor 20R from the detection value of the short-wavelength optical sensor 20W. Moreover, the red detection value is determined by subtracting the detection value of the infrared optical sensor 20Blk from the detection value of the red optical sensor 20R. Then, based on these detection values, the finger-based individual authentication is carried out. When the liquid crystal display device according to the present embodiment is used for the finger-based individual authentication, the short-wavelength transmission filter 18W may be replaced with a yellow filter with the 50% transmittance at an optical wavelength between 480 nm and 520 nm. In a liquid crystal display device in which a color filter includes four color pixels with a blue filter, a green filter, a yellow filter, and a red filter, the short-wavelength transmission filter 18W can be easily replaced with a yellow filter for realization of wide chromaticity range.

A peak of human visibility is near an optical wavelength about 550 nm for green and a visible range is between about 400 nm and about 700 nm, though these values involve individual differences.

Figure 8:
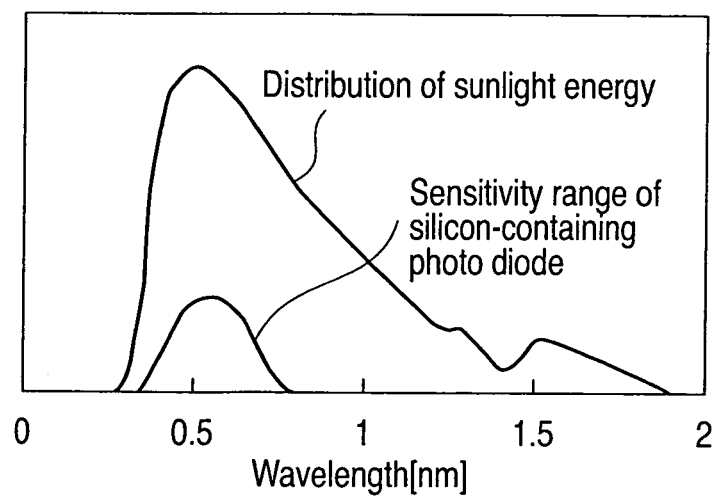
FIG. 8 is a graph showing an example of a sensitivity range of a silicon photodiode and a wavelength distribution of sunlight energy.

FIG. 8 is a graph showing an example of a sensitivity range of a photodiode and a wavelength distribution of sunlight energy.

The sensitivity range of a silicon photodiode used as the optical sensors 20W, 20R, and 20Blk varies depending on whether the photodiode contains amorphous silicon or polysilicon. The silicon photodiode generally senses a wavelength between 350 nm and 850 nm.

Figure 9:
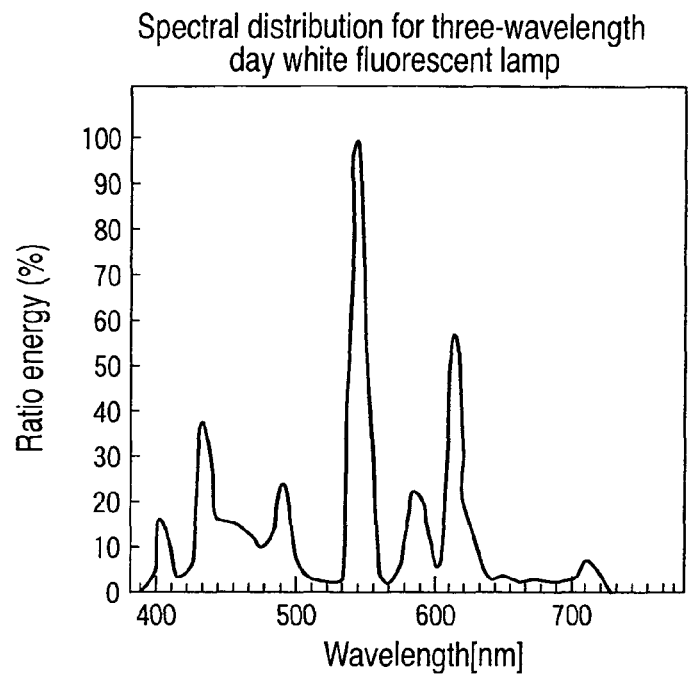
FIG. 9 is a graph showing an example of a wavelength distribution of a three-wavelength day white fluorescent lamp.

FIG. 9 is a graph showing an example of a wavelength distribution of a three-wavelength day white fluorescent lamp.

Figure 10:
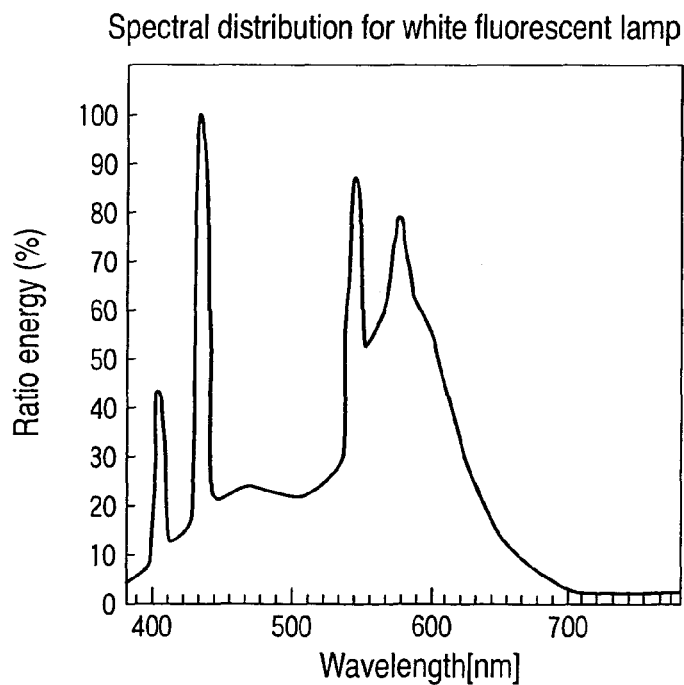
FIG. 10 is a graph showing an example of a wavelength distribution of a three-wavelength day white fluorescent lamp.

FIG. 10 is a graph showing an example of a wavelength distribution of a white fluorescent lamp.

FIG. 11 is a graph showing an example of a wavelength distribution of a light bulb (tungsten lamp).

Various external light environments are detected by the optical sensor. The optical wavelength even of natural light varies depending on the weather. For example, a wavelength distribution of a short wavelength (blue) varies significantly depending on the weather.

Thus, the intensity of external light varies greatly depending on the external light condition and the external light environment. The light intensity of the light source 3 is preferably varied depending on the external light condition and the external light environment.

The control section 9 controlling the light source 3, determines the optimum intensity of the light source 3 based on signals indicative of values obtained by the calculating section 8 by calculating values measured by the optical sensors 20W, 20R, and 20Blk. The control section 9 then outputs a control signal allowing the intensity to be realized, to the light source 3.

FIG. 12 is a graph showing an example of a human visibility.

In general, the peak of the human visibility is near an optical wavelength about 550 nm and the visible range is between about 400 nm and about 700 nm, though these values involve individual differences.

In the present embodiment, the calculating section 8 subtracts the detection value of the red optical sensor 20R from the detection value of the short-wavelength optical sensor 20W (ultraviolet detection value). The calculating section 9 further subtracts the detection value of the infrared optical sensor 20Blk (infrared detection value) from the detection value of the red optical sensor 20R. This allows the light intensity only of the human visible range can be determined.

For example, the control section 9 determines the intensity of the light source 3 corresponding to the light intensity in the calculated visible range based on the table 12 in which the light intensity in the human visible range is associated with an appropriate intensity of the light source 3 at the light intensity in the human visible range. For example, the control section 9 determines the light intensity of the light source 3 based on a calculating expression, a threshold, and a determination process which are required to calculate the appropriate light intensity of the light source 3 from the light intensity in the human visible range and the measured light intensity in the visible range. A relationship between the detection value and the appropriate light intensity of the light source 3 can be theoretically, empirically, and actually determined.

Skin color information required for the finger-based authentication is acquired by allowing the optical sensors 20W, 20R, and 20Blk to receive a green component (about 550 nm) and red component (about 610 nm) of reflected light and scattered light from the finger. In the present embodiment, the short-wavelength transmission filter 18W exhibits a high transmittance for the green component (about 550 nm) of light. The second red filter 20R exhibits a high transmittance for the red component (about 610 nm) of light. The control section 9 can use the detection values of a green and red component of light to accurately carry out the finger-based authentication.

The finger color is given mainly by melanine and hemoglobin and affected not only by light reflection but also by light scattering inside the finger. Furthermore, a variation in finger color not only results from individual differences but is also affected by the external light environment for the finger, the display status of the liquid crystal display device 1, and the light source 3. The calculating section 8 and control section 9 according to the present embodiment serve to suppress a adverse effect of the variation in finger color caused by various factors. This enables the user authentication to be accurately carried out.

An operation of the liquid crystal display device 1 according to the present embodiment configured as described above will be described.

The liquid crystal display device 1 comprises three type optical sensors including the short-wavelength optical sensor 20W, corresponding effectively to the blue and green components of incident light, the red optical sensor 20R, corresponding to the red component of the incident light, and the infrared optical sensor 20Blk, corresponding to a near-infrared light component which belongs effectively longer wavelength side than the visible range. The liquid crystal display device 1 perceives brightness and a finger input based on the components and quantity of the incident light and the contents of the signal. The following optical filters are superimposed above the three types of optical sensors 20W, 20R, and 20Blk; the short-wavelength transmission filter 18W, second red filter 18R, and infrared transmission filter 18Blk, having an equivalent transmittance of at least 90% at an optical wavelength longer than a wavelength of light, that is, 800 nm. Thus, the three types of optical sensors 20W, 20R, and 20Blk have almost the same sensitivity characteristics at an optical wavelength longer than 800 nm. Thus, the liquid crystal display device 1 can accurately and reliably detect the blue and green components by subtracting the detection value of the optical sensor 20R from the detection value of the optical sensor 20W. The liquid crystal display device 1 can also accurately and reliably detect the red component by subtracting the detection value of the optical sensor 20Blk from the detection value of the optical sensor 20R. As a result, the accuracy of the optical wavelength separation in the visible range can be improved.

When the short-wavelength transmission filter 18W, second red filter 18R, and infrared transmission filter 18Blk of the liquid crystal display device 1 have such spectral characteristics as shown in FIG. 5 described above, the liquid crystal display device 1 can determine the external light type and extract the green and red components; both components are the reflected light components of a skin color.

In the liquid crystal display device 1, the black matrix 23, comprising the material of the infrared transmission filter 18Blk and an organic pigment, is formed for the substrate 25. Furthermore, the light shield frame area 29, optically overlapping at least one of the red, blue, and green layers, is formed on the outer periphery of the display area. This enables suppression of adverse effect of stray light from externally incident light attributed to the thickness of the liquid crystal 22, which is generally between 2 μm and 6 μm, and stray light from the light source 3.

In the liquid crystal display device 1, the black matrix 23, comprising a material of the infrared transmission filter 18Blk and an organic pigment, may be formed for the surface of the substrate 21 which is closer to the liquid crystal 22. In this case, the liquid crystal display device 1 can be provided with both the display and input functions without the need to increase the number of steps of forming an infrared transmission filter 18Blk.

The liquid crystal display device 1 determines the components of light by performing calculating operations (subtractions) based on signals from the three types of optical sensors 20W, 20R, and 20Blk. Thus, noise such as dark currents in the optical sensors 20W, 20R, and 20Blk can be removed, thus allowing the blue and green components of incident light and the red component to be accurately separated from other components of incident light.

The liquid crystal display device 1 comprises the spacer 27 regulating the gap between the substrates 21 and 25. This allows the display elements 19B, 19G, and 19R and the optical sensors 20W, 20R, and 20Blk to be prevented from being damaged if mechanical pressure is applied to the liquid crystal display device 1.

In the liquid crystal display device 1, the spacer 27 and the short-wavelength transmission filter 18W are formed during one step. This allows the steps of manufacturing a liquid crystal display device 1 to be simplified, enabling a reduction in manufacturing costs.

In the liquid crystal display device 1, the shortwavelength transmission filter 18W may contain an ultraviolet absorbent that absorbs incident light at a wavelength shorter than 420 nm. Alternatively, the black matrix 23 or the frame area 29 may comprise a cured film of a resin material containing an ultraviolet absorbent that absorbs incident light at a wavelength shorter than 420 nm. This allows light with a wavelength shorter than 420 nm to be prevented from being detected if the optical sensor 20W is a silicon photoelectric conversion element containing amorphous silicon or polysilicon. Thus, the reliability of signals based on the optical sensor 20W can be improved.

The liquid crystal display device 1 may be provided with a function to allow the polarization plate 26 or a phase difference plate to absorb or reflect light with a wavelength shorter than 420 nm.

The liquid crystal display device 1 can adjust a display on a liquid crystal screen based on a wavelength distribution of external light obtained using signals from the optical sensors 20W, 20R, and 20Blk.

The human eye visibility corresponds to an optical wavelength range between about 380 nm and about 700 nm. However, as shown in ratio visibility of FIG. 12 described above, the range between 420 nm and 660 nm may be effectively set to be detected. A peak position of a visibility shifts slightly between a bright place condition and a dark place condition. The liquid crystal display device 1 according to the present embodiment carries out accurate external-light authentication in accordance with a human visibility.

In the liquid crystal display device 1, the optical sensors 20W, 20R, and 20Blk are arranged in the display area at almost equal intervals, and the light source 3 emitting light containing three wavelengths for blue, green, and red, is used to display the screen. Thus, light emitted by the light source 3 and having the three wavelengths for blue, green, and red can be used to accurately accept user's inputs.

The liquid crystal display device 1 can detect an object touching or approaching the liquid crystal display screen.

The liquid crystal display device 1 performs individual authentication based on signals for the finger input through the fully light-up window 14 (in a normally black liquid crystal display, the screen area in which red, green, and blue are all turned on). Thus, the individual authentication can be accurately carried out. The fully light-up area may be the entire liquid crystal screen or the window 14 with an area sufficient to receive the size of the finger may be partly displayed together with text for finger authentication guidance. For the finger-based authentication, the density at which the optical sensors 20W, 20R, and 20Blk are formed is preferably increased.

Effects of the liquid crystal display device 1 according to the present invention will be explained.

The present embodiment is effective in a technical field of the liquid crystal display device 1 with optical sensors. The present embodiment can provide the liquid crystal display device 1 with accurate optical sensors operating in accordance with the human visibility.

The liquid crystal display device 1 receives light and adjusts the light intensity of the light source 3 in accordance with the external light conditions.

Thus, a display quality of the liquid crystal display device 1 can be improved and prevented from being degraded by the adverse effect of the external light conditions.

The present embodiment allows the blue and green detection value and the red detection value to be accurately determined and enables the blue and green detection value to be distinguished from the red detection value. Various processes is executed based on the blue and green detection value and the red detection value.

In the present embodiment, the detection value of the red optical sensor 20R is subtracted from the detection value of the short-wavelength optical sensor 20W. Furthermore, the detection value of the infrared optical sensor 20Blk is subtracted from the detection value of the red optical sensor 20R. This provides very accurate information required to control the light source 3, detect an approaching or touching position specification object, detect the two-dimension position and movement of the position specification object for the screen, detect the skin color of the finger, and detect the individual authentication based on the finger. Additionally, misdetection and malfunctioning can be prevented, and the user's input operation can be accurately and reliably accepted. That is, the present embodiment enables more accurate individual authentication of the user and allows more accurate detection of a position specified by the user with the finger or another instruction objects and movement of the specified position.

The present embodiment allows the light intensity in the human visible range to be more accurately determined, and enables a reduction in the adverse effect of dark current and noise on the light detection values.

The liquid crystal display device 1 according to the present embodiment can perform luminance adjustment compatible with the visibility of eyes of a person who is an evaluator. Thus, the adverse effect for the liquid crystal display based on the type of external light can be suppressed, thus allowing luminance adjustment to be accurately and reliably performed.

In the present embodiment, the user's instruction input to the screen can be accepted even without a touch panel, thus enabling a reduction in the number of parts of the device. This in turn enables a reduction in the cost and thickness of the liquid crystal display device 1.

In the present embodiment, the display pixel 15 and the light detection pixel 16 can be manufactured during the same step. Thus, the manufacturing steps can be prevented from being complicated.

In the present embodiment, if the luminance of the light source 3 is adjusted in accordance with the intensity of external light, the light detection pixel 16 may be located outside the effective display screen, for example, around an outer peripheral portion of the display area.

In the present embodiment, the following configuration is possible. The light detection pixel 16 detects a signal while the light source 3 is unlit, for example, while a personal computer or a display is asleep. Then, when lighting of the liquid crystal display device 1 is started, the intensity of the light source 3 is controlled based on the detected signals. The light detection pixel 16 may be used as an optical communication receiver for the liquid crystal display device 1 which uses laser light, LED light, or the like.

In the present embodiment, the display elements 19B, 19G, and 19R and the optical sensors 20W, 20R, and 20Blk are shown to have a staggered structure but may be shown to have an inversely staggered structure. The display elements 19B, 19G, and 19R and the optical sensors 20W, 20R, and 20Blk may be formed of one of amorphous silicon, polysilicon, and low-temperature polysilicon. The display element scan section 4 and display element driving section 5 for the display elements 19B, 19G, and 19R and the sensor scan section 6 and sensor read section 7 for the optical sensors 20W, 20R, and 20Blk may be electrically connected to the substrate by using an FPC (Flexible Printed Circuit) or the like. Alternatively, these sections may be electrically connected to the substrate in monolithic system-on-panel form.

The liquid crystal display device 1 according to the present embodiment may be varied. For example, the calculating section 8 and the control section 9 may be integrated together. At least one of the various processes executed by the control section 9 may be carried out by an independent module.

(Second Embodiment)

In the present embodiment, a modification of the above-described first embodiment in which an infrared transmission filter is formed of a stack of a plurality of filters will be described.

Figure 13:
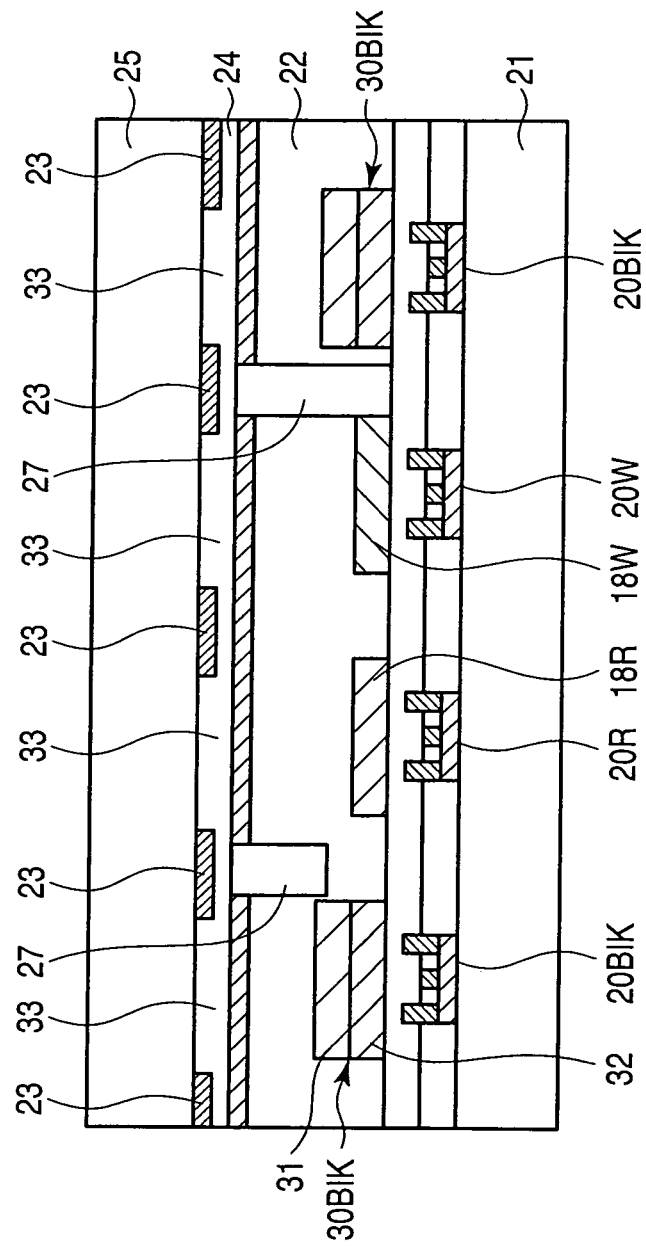
FIG. 13 is a sectional view showing an example of light detection pixels provided in a liquid crystal display device according to a second embodiment of the present invention.

FIG. 13 is a sectional view showing an example of a light detection pixel provided in a liquid crystal display device according to the present embodiment.

In the present embodiment, an infrared transmission filter 30Blk is formed of a stack of a red filter 31 and a blue filter 32.

In the present embodiment, a plurality of openings 33 through which light enters the pixel are formed in a substrate 25. The openings 33 are located opposite the infrared transmission filter 30Blk, a red filter 18R, and a short-wavelength transmission filter 18W via a liquid crystal 22, respectively. Optical sensors 20Blk, 20R, and 20W each receive light to be observed, via the plurality of openings 33, a liquid crystal 22, and a corresponding one of the infrared transmission filter 30Blk, red filter 18R, and short-wavelength transmission filter 18W.

In the present embodiment, the infrared transmission filter 30Blk is formed by stacking a plurality of filters used for other applications, such as a blue filter 17B, a green filter 17G, a first red filter 17R, and the second red filter 18R. Thus, a liquid crystal display device can be manufactured without an increase in the number of steps in order to forming an infrared transmission filter 30Blk.

(Third Embodiment)

In the present embodiment, description will be given of a modification of the first and second embodiments in which a liquid crystal display device comprises a light detection pixel 16 further including a yellow pixel.

FIG. 14 is a block diagram showing an example of a liquid crystal display device according to the present embodiment.

A liquid crystal display device 30 according to the present embodiment comprises a light source 3 behind a display screen section 31. A display element scan section 4, a display element driving section 5, a sensor scan section 6, and a sensor read section 7 are electrically connected to the display screen section 31.

The display screen section 31 comprises a color filter 32. In the present embodiment, display pixels 33 and light detection pixels 34 are disposed in the display area of the display screen section 31. The light detection pixels 34 are arranged on the display screen at almost equal intervals.

The display element scan section 4 and the display element driving section 5 operate to allow the display screen section 31 to display an image based on an image signal.

Moreover, the display screen section 31 comprises a light shield frame area 29 on the outer periphery of the display area.

The sensor scan section 6 and the sensor read section 7 operate to read light detection values (measured values) for a plurality of optical wavelength ranges from the light detection pixels in the display screen section 31. The sensor read section 7 sends the light detection values to the calculating section 8.

In the present embodiment, an calculating section 8 executes a first process of subtracting a detection value of a yellow optical sensor from a detection value of a short-wavelength optical sensor, a second process of subtracting a detection value of a red optical sensor from the detection value of the yellow optical sensor, and a third process of subtracting a detection value of an infrared optical sensor from the detection value of the red optical sensor.

The first process determines a signal intensity of a blue component of external light or reflected light from a position specification object.

The second process determines a signal intensity of a green component of external light or reflected light from a position specification object.

The third process determines a signal intensity of a red component of external light or reflected light from a position specification object.

The subtractions executed by the calculating section 8 enable variations among the display elements and the adverse effects of dark current and the light source 3 to be removed from the detection results.

Based on the blue, green, and red detection values received from the calculating section 8, a table 12 which is stored in the storage device 11, a determination condition for determining a threshold or control value, or a predetermined control calculating expression, the control section 9 determines an optimum control value for the light source 3 which correspond to the detection values for the three types of light. The control section 9 thus controls the light source 3 to adjust the luminance of the liquid crystal display device 1.

Moreover, the control section 9 carries out processing required for detection of a finger approaching or touching the display screen section 2, detection of a specified two-dimension position and two-dimension movement for a screen by a finger approaching or touching the display screen section 2, and individual authentication based on the blue detection value, the green detection value, and the red detection value received from the calculating section 8 and pattern data 13 stored in the storage device 11.

The light detection pixel 34 is located close to, for example, adjacent to the display element 33. A plurality of the light detection pixels 34 are arranged in the display screen of the liquid crystal display device 1 at almost equal intervals.

In the display screen section 31 of the liquid crystal display device 30, a combination of the display pixels 33 and the light detection pixels 34 is disposed like a matrix arrangement.

The display pixel 33 includes blue pixel 15B, green pixel 15G, first red pixel 15R, and transparent pixel 33W.

The light detection pixel 34 includes short-wavelength pixel 16W, second red pixel 16R, infrared pixel 16Blk, and yellow pixel 34Y.

Figure 15:
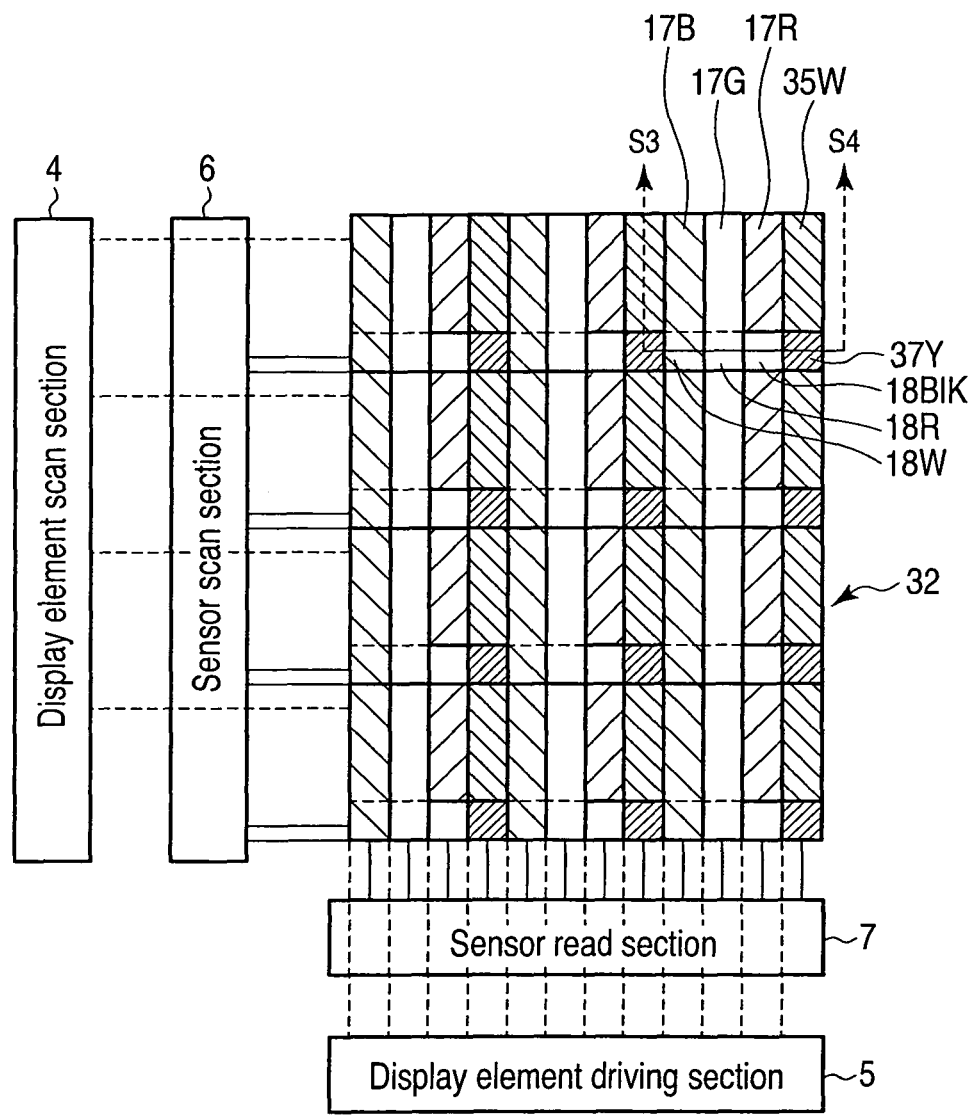
FIG. 15 is a plan view showing an example of a color filter of a liquid crystal display device according to the third embodiment.

FIG. 15 is a plan view showing an example of the color filter 32 of the liquid crystal display device 30 according to the present embodiment.

FIG. 16 is a sectional view showing an example of the display pixel 33.

FIG. 17 is a sectional view showing an example of the light detection pixel 34. FIG. 17 is a sectional view taken along line S3-S4 in FIG. 15.

The color filter 32 comprises a blue filter 17B for the blue pixel 15B, a green filter 17G for the green pixel 15G, a first red filter 17R for the first red pixel 15R, a transparent filter 35W for the transparent pixel 33W, a short-wavelength transmission filter (transparent filter) 18W for the short-wavelength pixel 16W, a second red filter 18R for the second red pixel 16R, an infrared transmission filter 18Blk for the infrared pixel 16Blk, and a yellow filter 37Y for the yellow pixel 34Y.

In the present embodiment, the transparent pixel 33W is disposed to increase a brightness of the liquid crystal display. Even when the transparent filter 35W for the transparent pixel 33W is replaced with one of a yellow filter, a cyan filter, and a magenta filter, the brightness of the liquid crystal display can still be increased. This also enables a reduction in the power consumption of the liquid crystal display device 30. In particular, a display element with a high luminosity and a wide chromaticity range can be provided by replacing the transparent filter 35W with the yellow filter. A configuration with the yellow filter optically superimposed on the short-wavelength optical sensor can be applied to a four-color-filter configuration with the yellow filter. Then, the resulting configuration can be combined with the red optical sensor 20R and infrared optical sensor described below.

In the blue pixel 15B, green pixel 15G, first red pixel 15R, and transparent pixel 33W in the display pixel 33, a blue display element 19B, a green display element 19G, a red display element 19R, and a transparent display element 36W are provided under the blue filter 17B, the green filter 17G, the first red filter 17R, and the transparent filter 35W.

In the short-wavelength pixel 16W, second red pixel 16R, infrared pixel 16Blk, and yellow pixel 34Y in the light detection pixel 34, a short-wavelength optical sensor 20W, a red optical sensor 20R, an infrared optical sensor 20Blk, and a yellow optical sensor 38Y are provided under the short-wavelength transmission filter 18W, second red filter 18R, infrared transmission filter 18Blk, and yellow filter 37Y.

In the present embodiment, the following are provided on one surface of the substrate 21: the blue display element 19B, green display element 19G, red display element 19R, transparent display element 36W, short-wavelength optical sensor 20W, red optical sensor 20R, infrared optical sensor 20Blk, and yellow optical sensor 38Y. The light source 3 is provided on the other surface of the substrate 21.

The filters 17B, 17G, 17R, 35W, 18W, 18R, 18Blk, and 37Y in the color filter 32 are disposed in the display area on the substrate 21.

A substrate 25 comprising a black matrix 23 and a smoothed layer 24 is located, via the liquid crystal 22, over the display elements 19B, 19G, 19R, and 36W, the optical sensors 20W, 20R, 20Blk, and 38Y, and the filters 17B, 17G, 17R, 35W, 18W, 18R, 18Blk, and 37Y.

That is, in FIG. 16 described above, the following are stacked above the substrate 21 in which the display elements 19B, 19G, 19R, and 36W are formed: the transparent electrode 26 all electrically connected to the display elements 19B, 19G, 19R, and 36W; the filters 17B, 17G, 17R, and 35W; the liquid crystal 22; the black matrix 23; the smoothed layer 24; and the substrate 25.

Light from the light source 3 is emitted to the exterior via the filters 17B, 17G, 17R, and 35W.

Incident light from the exterior is received by the optical sensors 20W, 20R, 20Blk, and 38Y via the filters 17B, 17G, 17R, and 35W.

The color filter 32 is formed between the substrates 21 and 25, and in the present embodiment, on a surface of the substrate 21 which is closer to the liquid crystal.

As shown in FIG. 17, the following are arranged for the substrate 21 as the light detection pixel 34: a stack of the short-wavelength optical sensor 20W and the short-wavelength transmission filter 18W, a stack of the red optical sensor 20R and the second red filter 18R, a stack of the infrared optical sensor 20Blk and the infrared transmission filter 18Blk, a stack of the yellow optical sensor 38Y and the yellow filter 37Y, and a spacer 27.

In the present embodiment, the liquid crystal display device 30 may be transflective, and some of the pixels may comprise reflection electrodes to reflect light.

FIG. 18 is a graph showing an example of spectral characteristics of the short-wavelength transmission filter 18W, the second red filter 18R, the infrared transmission filter 18Blk, and the yellow filter 37Y.

The spectral characteristics of the short-wavelength transmission filter 18W, the second red filter 18R, and infrared transmission filter 18Blk are similar to those shown in FIG. 5 described above and will thus not be described.

The yellow filter 37W exhibits a 50% transmittance at an optical wavelength range between 480 nm and 520 nm and offers a transmittance characteristic such that a transmittance is low when the wavelength is smaller than the value corresponding to the 50% transmittance and is high when the wavelength is larger than the value corresponding to the 50% transmittance. The yellow filter 37Y is optically superimposed above the yellow optical sensor 38Y. The transmittance of the yellow filter 37W is low for light with a wavelength shorter than 460 nm, and increases rapidly when the optical wavelength is longer than about 460 nm. The transmittance is kept at a large value of at least 95% when the optical wavelength is close to 540 nm or equal to or longer than 540 nm.

In the present embodiment, the filter 37Y stacked on the optical sensor 38Y preferably has a characteristic such that a transmittance is low when the wavelength is smaller than the value corresponding to the 50% transmittance and is high when the wavelength is larger than the value corresponding to the 50% transmittance.

The transmittance at each wavelength in the spectral characteristic of the yellow filter 37Y in FIG. 18 is multiplied by a sensitivity of the yellow sensor 38Y at the wavelength to determine an effective sensitivity of the optical sensor 38Y that uses the yellow filter 37Y.

FIG. 19 is a graph showing an example of spectral characteristics resulting from a subtraction carried out by the calculating section 8 according to the present embodiment.

At each wavelength, the subtraction of the transmittance of the yellow filter 37Y from the transmittance of the short-wavelength transmission filter 18W corresponds to a spectral characteristic 39B. A wavelength range with a high transmittance in the spectral characteristic 39B corresponds to the wavelength range of blue light.

Thus, the calculating section 8 subtracts the detection value of the yellow optical sensor 38Y from the detection value of the short-wavelength optical sensor 20W to calculate a blue detection value.

At each wavelength, the subtraction of the transmittance of the second red filter 18R from the transmittance of the yellow filter 37Y corresponds to a spectral characteristic 39G. A wavelength range with a high transmittance in the spectral characteristic 39G corresponds to the wavelength range of green light.

Thus, the calculating section 8 subtracts a detection value of the red optical sensor 20R from a detection value of the yellow optical sensor 38Y to calculate a green detection value.

At each wavelength, a subtraction of a transmittance of the infrared transmission filter 18Blk from a transmittance of the second red filter 18R corresponds to a spectral characteristic 39R. A wavelength range with a high transmittance in the spectral characteristic 39R corresponds to a wavelength range of red light.

Thus, the calculating section 8 subtracts the detection value of the infrared optical sensor 20Blk from the detection value of the red optical sensor 20R to calculate a red detection value.

Based on the blue, green, red detection values calculated by the calculating section 8, the control section 9, for example, controls the light source 3, detects an approaching or touching position specification object, detects a two-dimension position for screen specified by the user, detects movement of the position specified by the user, and individually authenticate the user.

Figure 20:
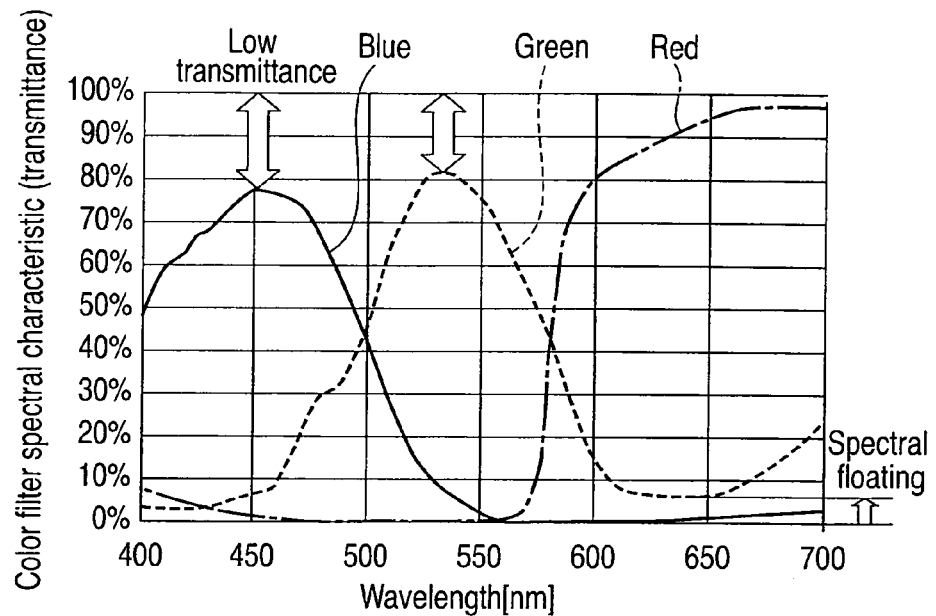
FIG. 20 is a graph showing transmittances of a general blue filter, a general green filter, and a red filter at each wavelength.

FIG. 20 is a graph showing transmittances of a general blue filter, a general green filter, and a red filter at each wavelength.

Transmission characteristics of the blue and green filters used in a general color filter involve spectral floating on the long wavelength side. The blue and green filters thus exhibit nonuniform transmittance characteristics.

A comparison between the spectral characteristics obtained by the subtraction as shown in FIG. 19 and the spectral characteristics shown in FIG. 20 indicates that for example, an increase and decrease in the spectral characteristic of blue determined by the subtraction are sharper than those in the spectral characteristic of the general blue filter. Furthermore, a peak of a blue transmittance determined by the subtraction is higher than a peak of the general blue filter. That is, in a wavelength range that is important in detection of blue light, the blue transmittance determined by the subtraction is higher than the blue transmittance of the general blue filter. Thus, in measurement of blue light, measurement of intensity of blue light based on the subtraction allows blue light to be measured more accurately than measurement of intensity of blue light using the general blue filter.

For example, an increase and decrease in the spectral characteristic of green determined by the subtraction are sharper than those in the spectral characteristic of the general green filter. Furthermore, a peak of a green transmittance determined by the subtraction is higher than a peak of the general green filter. That is, in a wavelength range (for example, the range is around 550 nm) that is important in detection of blue light, the green transmittance determined by the subtraction is higher than that of the general green filter. For the transmittance of the general green filter, spectral floating occurs, for example, within a high wavelength range of at least about 640 nm. In contrast, for the green transmittance determined by the subtraction, spectral floating is suppressed. Thus, in measurement of green light, measurement of intensity of green light based on the subtraction allows green light to be measured more accurately than measurement of intensity of green light using the general green filter.

For example, a transmittance of the general red filter also has a large value in an infrared range including higher wavelengths higher than a visible light range. The general red filter thus measures light that cannot be sensed by human beings. In contrast, a red transmittance determined by the subtraction is reduced in the infrared range which is higher wavelength range than the visible light range. That is, in an optical wavelength range to be prevented from being measured when red light is to be detected, the red transmittance determined by the subtraction is lower than that of the general red filter. Thus, in measurement of red light, measurement of intensity of red light based on the subtraction allows red light to be measured more accurately than measurement of intensity of red light using the general red filter in such a manner that the light measurement approximates a human sense.

The liquid crystal display device 30 according to the present embodiment described above comprises the yellow filter 37Y and the optical sensor 38Y receiving incident light via the yellow filter 37Y. In the present embodiment, the calculating operation is performed based on signals from the four types of optical sensors. Thus, noise such as dark currents in the optical sensors can be removed from the light detection results. This allows the blue, green, and red components of incident light to be accurately separated from one another. Hence, the incident light can be more accurately perceived.

The present embodiment allows external light to be perceived in a manner compatible with the human visibility. Hence, appropriate control can be achieved based on signals input by the light detection pixel 34.

The present embodiment provides light detection values more appropriate than those obtained using a normal three-primary-color filter, thus allowing the perception of the skin color of the finger and the individual authentication.

Instead of additionally using the yellow filter 37Y and the yellow optical sensor 38Y, the present embodiment may use the short-wavelength transmission filter 18W and the short-wavelength optical sensor 20W for yellow measurement. Then, blue light, green light, and red light can be accurately measured in such a manner that the measurement approximates the human sensitivity. The light source 3 can then be adjusted based on the measured values. As a result, various perceptions can be accurately performed on input signals.

(Fourth Embodiment)

In the present embodiment a modification of the above-described embodiments in which the color filter 10 or 32 is formed on the side of the substrate 25 located on a display surface side of a liquid crystal display device. A modification of the second and third embodiments will be described below. However, other embodiments may be similarly modified.

Figure 21:
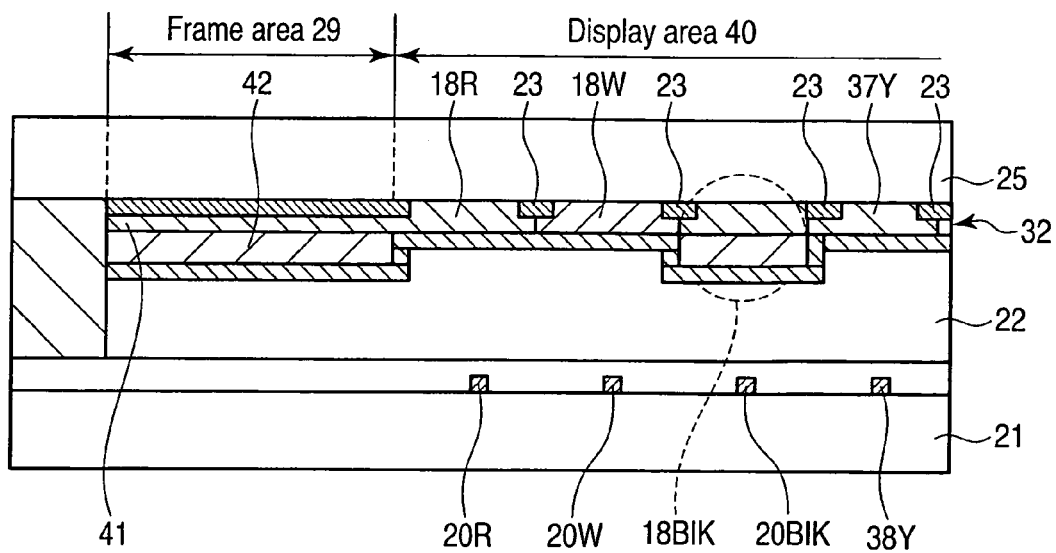
FIG. 21 is a diagram showing an example of a cross section of an optical sensor of a liquid crystal display device according to a fourth embodiment of the present invention in an optical sensor arrangement direction.

FIG. 21 is a diagram showing an example of a cross section of an optical sensor of the liquid crystal display device according to the present embodiment in an optical sensor arrangement direction.

FIG. 22 is a diagram showing an example of a cross section of a display element of the liquid crystal display device according to the present embodiment in a display device arrangement direction.

In the present embodiment, the color filter 32 is formed on the side of a substrate 25 on the side of display screen, and a surface of the substrate 25 of the side of the liquid crystal 22. A frame area 29 is formed on the outer periphery of a display area 40 of the liquid crystal display device. A red layer 41 and a blue layer 42 are stacked in the frame area 29.

A black matrix 23 is located in the display area of the color filter 32 like a matrix arrangement. Display elements 19R, 19G, 19B, and 36W and optical sensors 20R, 20W, 20Blk, and 38Y are installed under the display area 40 of the color filter 32.

The frame area 29 may be formed of a light shield layer corresponding to an extension of the black matrix 23. Moreover, in the frame area 29, in addition to the light shield layer, the red layer 41 and the blue layer 42 are stacked. This improves the light shield capability of the frame area 29.

When the color filter 32 is formed on the side of the substrate 21 on which the optical sensors and the display elements are formed, the red layer 41 and the blue layer 42 are preferably also formed on the side of substrate 21. Furthermore, in the present embodiment, the short-wavelength optical sensor 20W, the red optical sensor 20R, the infrared optical sensor 20Blk, and the yellow optical sensor 38Y are preferably formed on the substrate 21, on which the display elements 19R, 19G, 19B, and 36W are formed. This is because this configuration allows the steps of manufacturing a liquid crystal display device to be simplified.

If the liquid crystal display device according to the present embodiment is based on a transverse electric field mode or a liquid crystal driving scheme called in plane switching (IPS), the transparent electrode formed above the color filter 32 may be omitted.

According to the present embodiment described above, in the frame area 29, in addition to the light shield layer, the red layer 41 and the blue layer 42 are stacked. This improves the light shield capability of the frame area 29.

Furthermore, the red layer 41 and the blue layer 42 can be formed simultaneously with formation of the color filter 32. This allows the steps of manufacturing the liquid crystal display device to be prevented from being complicated.

(Fifth Embodiment)

In the present embodiment, a black matrix substrate that can be provided in the liquid crystal display device according to each of the above-described embodiments will be described.

FIG. 23 is a sectional view showing an example of a black matrix substrate according to the present embodiment.

In a black matrix substrate 43, a black matrix 23 is formed above a transparent substrate 25. A smoothed layer 24 is formed above the transparent substrate 25 and the black matrix 23. The spacers 27 are formed above the smoothed layer 24.

In the present embodiment, a main spacer and a sub-spacer included the spacers 27 are formed, via the smoothed layer 24, on the pattern of the black matrix 23 formed in a matrix.

The height of the main spacer is almost the same as the required thickness of a liquid crystal formed into liquid crystal cells (for example, 4.1 μm). The sub-spacer is lower than the main spacer (for example, 3.4 μm). The height of the spacer 27 is from the surface of the smoothed layer 24 to the top of the spacer.

The spacer 27 is formed so as to locate between the plurality of optical sensors formed on the substrate 21 in a matrix when the black matrix substrate 43 laminated to the substrate 21 with the color filter 10 or 32 is seen in a planar view. In the substrate 21, the color filter 10 or 32 is stacked on an active element including an optical sensor.

The sub-spacer is a secondary spacer holding a gap between the black matrix substrate 43 and the substrate 21 if high pressure is applied to the liquid crystal display device.

The raw material of the spacer 27 may be a photosensitive transparent resin. The spacer 27 is formed by, for example, a photolithography method.

(Sixth Embodiment)

In the present embodiment, a color filter substrate that can be provided in the liquid crystal display device according to each of the above-described embodiments will be described.

FIGS. 24 and 25 are a first sectional view and a second sectional view, respectively, showing an example of a color filter substrate according to the present embodiment.

In a color filter substrate 44, a black matrix 23 is formed above a transparent substrate 25 such as glass in a matrix. A light shield frame area 29 is formed around an outer peripheral portion of a display area.

A color filter is formed above a surface of the transparent substrate 25 on which the black matrix 23 is formed; the color filter comprises the red filter 18R corresponding to a red optical sensor 20R, the short-wavelength transmission filter 18W corresponding to the short-wavelength optical sensor 20W, and the infrared transmission filter 18Blk corresponding to the infrared optical sensor 20Blk and in which a red layer 41 and a blue layer 42 are stacked. Moreover, the spacers 27 are formed above the color filter 32.

The height of the main spacer is almost the same as the required thickness of the liquid crystal 22 formed into a cell (for example, 4.1 μm). The height of the sub-spacer is, for example, 3.4 μm.

The spacer 27 is formed so as to lie between optical sensors formed in a matrix when the color filter substrate 44 laminated to a substrate 21 on which the display elements and optical sensors are formed is seen in a planar view.

The sub-spacer is a secondary spacer to hold a gap between the color filter substrate 44 and the substrate 21 if high pressure is applied to the liquid crystal display device. The height of the spacer 27 is from the surface of the color filter 32 to the top of the spacer 27. If a flattened layer 24 is formed on the color filter 32, the height of the spacer 27 is from the surface of the flattened filter 24 to the top of the spacer 27.

In the present embodiment, a black matrix 23 with a small film thickness is formed in a display area 29. The frame area 29 outside the display area 40 has a light shield function. Moreover, the red layer 41 and the blue layer 42 are stacked in the frame area 29, thus enhancing the light shield capability of the frame area 29.

The black matrix 23 normally needs to have a high optical density of, for example, 3 to 4 in terms of an OD value. However, an increase in optical density involves the following two problems. A first problem is that exposure is difficult to carry out in pattern formation based on photolithography. Thus, forming thin wires of thickness at no more than 15 μm is difficult, resulting in peel-off or an inappropriate shape during a development step. A second problem is that an increase in optical density needs to increase the film thickness of the black matrix 23, for example, from 1.5 μm to 2 μm. The increased thickness of the black matrix 23 also increases the thickness of the stack of the black matrix 23 and the color filter 32. The height of what is called a horn above the black matrix 23 disturbs the orientation of the liquid crystal 22. This may cause image quality to be degraded.

The light shield capability of the black matrix 23 in the display area 40 may correspond to an optical density at which malfunctioning of the display element caused by external light and noise are avoided (for example, about 1 in terms of the OD value). In contrast, for the frame area 29 around an outer peripheral portion of the display area 40, a high light shield capability is strongly required in terms of display quality.

In the present embodiment, for example, the black matrix 23 in the display area 40 is formed so as to be 1 μm (optical density of about 2). In the frame area 29 outside the display area 40, not only a light shield substance similar to that of the black matrix 23 but also the red layer 41 and blue layer 42 are stacked to increase the optical density. For example, the frame area 29 may have an optical density between 1.5 and 2.

If the black matrix 23 in the display area 40 has a film thickness of 1 μm, when for example, a 1.5 μm black matrix 23 is used, the height of the horn can be reduced to half from 0.6 μm to at most 0.3 μm. This allows liquid crystal orientation to be stabilized.

The optical density of the black matrix 23 in the display area 40 may be set to at least 1 in order to suppress malfunctioning of the display element (TFT) and noise from the display element.

In a high-image-quality liquid crystal display device for which members need to have a low dielectric constant, for example, a liquid crystal display device based on the in the transverse electric field mode (horizontal alignment method) or a vertical alignment method, for members disposed in contact with or close to the liquid crystal, carbon with a high dielectric constant is preferably excluded from the color material of the black matrix 23 as possible. The film thickness of the black matrix 23 in the display area 40 is preferably at no more than 1 μm in terms of liquid crystal orientation.

The present embodiment is preferable in that the lamination of the color filter substrate and the TFT substrate on which the display elements are formed so as to avoid affecting the manufacturing throughput of the TFT substrate.

The configuration in which the opposite substrate is laminated to the TFT substrate on which the color filter 32 is disposed is preferable in that the confirmation is unlikely to be affected by oblique incident light because the color filter 32 is stacked directly on the optical sensor.

(Seventh Embodiment)

In the present embodiment, the pigments and dyes used in the above-described embodiments will be described.

The red pigment applied to the first and second red filters 17R and 18R and the like may be, for example, C.I. Pigment Red 7, 14, 41, 48:2, 48:4, 81:1, 81:2, 81:3, 81:4, 146, 168, 177, 178, 179, 184, 185, 187, 200, 202, 208, 210, 246, 254, 255, 264, 270, 272, or 279. The red pigment may be used with a yellow pigment or an orange pigment.

The yellow pigment applied to the yellow filter 36Y and the like may be, for example, C.I. Pigment Yellow 1, 2, 3, 4, 5, 6, 10, 12, 13, 14, 15, 16, 17, 18, 24, 31, 32, 34, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 139, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 198, 199, 213, or 214. C.I. Pigment Yellow 139 is mainly used as the pigment for the yellow filter 36Y.

The green pigment used for the green filter 17G may be, for example, C.I. Pigment Green 7, 10, 36, 37, or 58. The green pigment may be used with the yellow pigment.

The blue pigment applied to the blue filter 17B may be, for example, C.I. Pigment Blue 15, 15:1, 15:2, 15:3, 15:4, 15:6, 16, 22, 69, or 64. The blue pigment may be used with a purple pigment. In this case, the violet pigment may be, for example, C.I. Pigment Violet 1, 19, 23, 27, 29, 30, 32, 37, 40, 42, or 50.

The pigment applied to the infrared transmission filter 18Blk is obtained by for example, mixing plural types of the above-described pigments together. For example, the pigment applied to the infrared transmission filter 18Blk is preferably a mixture of the blue pigment and the red pigment. For example, the pigment applied to the infrared transmission filter 18Blk may be a mixture of a violet pigment and a yellow pigment. For example, the pigment applied to the infrared transmission filter 18Blk may be a mixture of a violet pigment, a yellow pigment, and red pigment.

The color material applicable to the black matrix 23 is a dispersion serving to add carbon, graphite, an organic pigment, a dye, or the like to a transparent resin. The carbon is commercially available in a past form in which the carbon is dispersed in an organic solvent together with a polymer and a dispersant. To form a black matrix 23 or to form a black matrix 23 and an infrared transmission filter 18Blk during the same process from an application step to a photolithography step, the ratio of the color materials (the weight ratio of only the color materials) is set such that the amount of organic pigment added is 90%, whereas the amount of carbon added is the remaining 10%. The carbon absorbs the infrared wavelength of light including the near-infrared range. Thus, the amount of carbon added to the infrared transmission filter 18Blk is preferably at most 10% and more preferably at most 3%. The black matrix 23 containing an organic pigment as a main color material offers a lower light shield capability than a black matrix 23 with more carbon addition. Thus, the frame area 29 located around the outer periphery of the display area 40 is preferably formed by optically superimposing one to three layers on one another which are selected from the red filter 17R and 18R, the blue filter 17B, and the green filter 17G. Alternatively, the black matrix 23 containing an organic pigment as a main color material may be formed both on the color filter substrate 44 and on the TFT substrate so as to have a small film thickness of, for example, 1 μm.

The ultraviolet absorbent that can be added to the short-wavelength transmission filter 18W according to the above-described embodiments may be a benzotriazole-containing compound, a benzophenone-containing compound, a salicylate compound, a coumalin-containing compound, or any of these ultraviolet absorbents to which a photo stabilizing agent or a quencher is added. A photo initiator or a curing agent which has an ultraviolet absorption function may be selected as an ultraviolet absorbent.

The transparent resin according to the present embodiment preferably has a transmittance of at least 80% and more preferably at least 95% at a wavelength between 400 nm and 700 nm, corresponding to the visible light wavelength range. Examples of the transparent resin include a thermal plastic resin, a thermosetting resin, and a photosensitive resin. A precursor for the transparent resin may be a monomer or an oligomer which is cured by irradiation of radiation to generate a transparent resin. The transparent resin may be a single type of resin or a mixture of at least two types of resins. Any of the above-described pigments can be dispersively applied to the transparent resin as an alkali-soluble photosensitive resin.

What is claimed is:
1. A liquid crystal display device comprising:
a first substrate;

a second substrate located opposite the first substrate via a liquid crystal;

a blue display element, a green display element, a red display element, a short-wavelength optical sensor, a red optical sensor, and an infrared optical sensor formed on a liquid crystal side surface of the first substrate;

a color filter formed between the first substrate and the second substrate and comprising a blue filter, a green filter, a first red filter, a short-wavelength transmission filter, a second red filter, and an infrared transmission filter corresponding to the blue display element, the green display element, the red display element, the short-wavelength optical sensor, the red optical sensor, and the infrared optical sensor, respectively; and a calculating section which calculates a difference between a signal for incident light obtained by a first optical sensor and a signal for incident light obtained by a second optical sensor which is used for detecting the shortest wavelength range next to that of the first optical sensor, the first and second optical sensors being included in the plurality of optical sensors which measures the incident light via the color filter, wherein the first and second red filters have a 50% transmittance at an optical wavelength between 580 nm and 620 nm, and have a transmittance characteristic such that a transmittance is lower than the 50% transmittance when a wavelength is smaller than a wavelength corresponding to the 50% transmittance, and is higher than the 50% transmittance when the wavelength is larger than the wavelength corresponding to the 50% transmittance, and the first and second red filters are optically superimposed above the red display element and the red optical sensor, respectively, and the infrared transmission filter has a 50% transmittance at an optical wavelength between 650 nm and 720 nm, and has a transmittance characteristic such that a transmittance is lower than the 50% transmittance when a wavelength is smaller than a value corresponding to the 50% transmittance, and is higher than the 50% transmittance when the wavelength is larger than the value corresponding to the 50% transmittance, and the infrared transmission filter is optically superimposed above the infrared optical sensor.

2. A liquid crystal display device according to claim 1, further comprising a control section which detects an object touching or approaching a display area based on signals obtained by the plurality of optical sensors formed on the first substrate and measuring the incident light via the color filter.

3. A liquid crystal display device according to claim 1, further comprising:

a first authentication section which controls the plurality of display elements formed on the first substrate to fully light up at least a part of the display area; and a second authentication section which allows the plurality of optical sensors formed on the first substrate to measure, via the color filter, reflected light from a finger touching or approaching the at least a part of the display area, to compare the signals obtained by the plurality of optical sensors with pre-registered individual finger pattern data, and to perform individual authentication.

4. A liquid crystal display device according to claim 1, further comprising a control section which controls displayed brightness based on the signals for the incident light obtained by the plurality of optical sensors which measure the incident light via the color filter.

5. A liquid crystal display device according to claim 1, wherein the plurality of optical sensors which measures the incident light via the color filter are arranged in the display area at equal intervals, and the device further comprises a light source formed for a back surface side of the first substrate which is not a liquid crystal side and which emits light containing at least three wavelengths for blue, green, and red.

6. A liquid crystal display device according to claim 1, further comprising a yellow optical sensor formed on a liquid crystal side surface of the first substrate, and the color filter further comprises a yellow filter corresponding to the yellow optical sensor.

7. A liquid crystal display device according to claim 6, wherein the yellow filter has a 50% transmittance at an optical wavelength between 480 nm and 520 nm, and has a transmittance characteristic such that a transmittance is lower than the 50% transmittance when a wavelength is smaller than a wavelength corresponding to the 50% transmittance, and is higher than the 50% transmittance when the wavelength is larger than the wavelength corresponding to the 50% transmittance, and the yellow filter is optically superimposed above the yellow optical sensor.

8. A liquid crystal display device according to claim 1, wherein the short-wavelength transmission filter has a 50% transmittance at an optical wavelength between 380 nm and 450 nm, and has a transmittance characteristic such that a transmittance is lower than the 50% transmittance when a wavelength is smaller than a wavelength corresponding to the 50% transmittance, and is higher than the 50% transmittance when the wavelength is larger than the wavelength corresponding to the 50% transmittance, and the short-wavelength transmission filter is optically superimposed above the short-wavelength optical sensor.

9. A liquid crystal display device according to claim 1, wherein the short-wavelength transmission filter is a first yellow filter having a 50% transmittance at an optical wavelength between 480 nm and 520 nm, and having a transmittance characteristic such that a transmittance is lower than the 50% when a wavelength is smaller than a wavelength corresponding to the 50% transmittance, and is higher than the 50% transmittance when the wavelength is larger than the wavelength corresponding to the 50% transmittance, and the short-wavelength transmission filter is optically superimposed above the short-wavelength optical sensor, the device further comprises a yellow display element formed on a liquid crystal side surface of the first substrate, and a second yellow filter formed between the first substrate and the second substrate and superimposed above the yellow display element.

10. A liquid crystal display device according to claim 1, wherein the infrared transmission filter has a laminating structure comprising a red layer and a blue layer.

11. A liquid crystal display device according to claim 1, wherein a black matrix having a light shield capability and comprising a material of the infrared transmission filter and an organic pigment is formed at least either on a liquid crystal side surface of the first substrate or on the second substrate.

12. A liquid crystal display device according to claim 1, further comprising a light shield area formed around an outer periphery of a display area and in which at least one of a red layer, a blue layer, and a green layer is optically superimposed.

13. A liquid crystal display device according to claim 1, further comprising a spacer which regulates a gap between the first substrate and the second substrate and is positioned between adjacent optical sensors above the first substrate when the substrates are seen in a planar view.

14. A liquid crystal display device according to claim 13, wherein the spacer is formed during the same step as that in which the short-wavelength transmission filter is formed.

15. A liquid crystal display device according to claim 1, wherein the short-wavelength transmission filter is formed of a resin material comprising an ultraviolet absorbent which absorbs the incident light at an optical wavelength shorter than 420 nm.

16. A liquid crystal display device according to claim 1, wherein the color filter is formed on a liquid crystal side surface of the first substrate.

17. A liquid crystal display device according to claim 11, wherein the black matrix further comprises a cured film of a resin material comprising an ultraviolet absorbent absorbing light at a wavelength shorter than 420 nm.

18. A black matrix substrate provided in the liquid crystal display device according to claim 1, the black matrix substrate comprising:
- a black matrix having a light shield capability and located between the plurality of optical sensors formed on the first substrate adjacent to one another when the black matrix substrate which is opposite to the first substrate is placed is seen in a planar view; and
- at least two types of spacers formed above the black matrix when the black matrix substrate is seen in a planar view, the spacers having different heights.

* * * * *